(12) United States Patent
Shinohara et al.

(10) Patent No.: US 8,778,543 B2
(45) Date of Patent: Jul. 15, 2014

(54) SULFIDE-BASED LITHIUM-ION-CONDUCTING SOLID ELECTROLYTE GLASS, ALL-SOLID LITHIUM SECONDARY BATTERY, AND METHOD FOR MANUFACTURING ALL-SOLID LITHIUM SECONDARY BATTERY

(75) Inventors: Yuji Shinohara, Kofu (JP); Takeo Kawase, Suwa (JP); Shigeo Kondo, Hirakata (JP)

(73) Assignee: Seiko Epson Corporation, Tokyo (JP)

( * ) Notice: Subject to any disclaimer, the term of this patent is extended or adjusted under 35 U.S.C. 154(b) by 528 days.

(21) Appl. No.: 12/327,343

(22) Filed: Dec. 3, 2008

(65) Prior Publication Data
US 2009/0142669 A1 Jun. 4, 2009

(30) Foreign Application Priority Data

Dec. 3, 2007 (JP) ................ 2007-312070
Oct. 21, 2008 (JP) ................ 2008-270610

(51) Int. Cl.
*H01M 10/0562* (2010.01)

(52) U.S. Cl.
USPC ........... 429/320; 429/322; 429/323; 252/62.2

(58) Field of Classification Search
USPC ............... 429/188–207, 300–347; 252/62.2
See application file for complete search history.

(56) References Cited

U.S. PATENT DOCUMENTS

| | | | |
|---|---|---|---|
| 4,585,714 A * | 4/1986 | Akridge | 429/323 |
| 5,217,826 A * | 6/1993 | Yamamura et al. | 429/319 |
| 7,425,518 B2 | 9/2008 | Yoshida et al. | |
| 7,648,537 B2 | 1/2010 | Harada et al. | |
| 7,674,559 B2 | 3/2010 | Min et al. | |
| 7,901,468 B2 | 3/2011 | Harada et al. | |
| 2007/0248888 A1 | 10/2007 | Seino et al. | |
| 2008/0274411 A1 * | 11/2008 | Nakajima et al. | 429/322 |

FOREIGN PATENT DOCUMENTS

| | | |
|---|---|---|
| CN | 1755975 A | 4/2006 |
| CN | 1965378 A | 5/2007 |
| JP | 06-279049 A | 10/1994 |
| JP | A-6-340446 | 12/1994 |
| JP | 08-138724 A | 5/1996 |
| JP | A-10-3818 | 1/1998 |
| JP | A-10-289617 | 10/1998 |
| JP | A-10-334731 | 12/1998 |
| JP | A-11-73992 | 3/1999 |
| JP | 2004-152659 A | 5/2004 |
| JP | 2004-250276 A | 9/2004 |
| JP | A-2006-244734 | 9/2006 |
| WO | WO 2005/112180 A1 | 11/2005 |
| WO | WO 2005112180 A1 * | 11/2005 |

OTHER PUBLICATIONS

Liang, "Conduction Characteristics of the Lithium Iodide—Aluminium Oxide Solid Electrolytes", Journal of the Electrochemcial Society, *Electrochemical Science and Technology*, Oct. 1973, pp. 1289-1292.

(Continued)

*Primary Examiner* — Raymond Alejandro
*Assistant Examiner* — Helen McDermott
(74) *Attorney, Agent, or Firm* — Oliff PLC

(57) ABSTRACT

A sulfide-based lithium-ion-conducting solid electrolyte glass is formed from sulfide-based lithium-ion-conducting solid electrolyte, and α-alumina.

18 Claims, 6 Drawing Sheets

Basic battery structure

(56) References Cited

OTHER PUBLICATIONS

Inada et al. "Fabrication and properties of composite sold-state electrolytes", Solid State Ionics (2003), 158 (3,4), pp. 275-280.

Mar. 14, 2011 Office Action issued in U.S. Appl. No. 12/230,767.
Jun. 28, 2011 Office Action issued in U.S. Appl. No. 12/230,767.
Jones et al., "A thin-film solid-state microbattery," *Journal of Power Sources*, 1993, pp. 505-513.

\* cited by examiner

Basic battery structure

Electrode structure

Electrode structure 3-1

Electrode structure 3-2

Electrode structure 3-3

Electrode current collector structure

401

402

403

404

Battery in different structure

Structure of metal mold for forming electrode

Metal mold for integral forming of electrode and electrolyte

Flow chart of forming battery element

Flow chart of steps of forming battery

SULFIDE-BASED LITHIUM-ION-CONDUCTING SOLID ELECTROLYTE GLASS, ALL-SOLID LITHIUM SECONDARY BATTERY, AND METHOD FOR MANUFACTURING ALL-SOLID LITHIUM SECONDARY BATTERY

CROSS-REFERENCE TO RELATED APPLICATION

This application claims a priority to Japanese Patent Application No. 2007-312070 filed on Dec. 3, 2007 and No. 2008-270610 filed on Oct. 21, 2008 which are hereby expressly incorporated by reference herein in its entirety.

BACKGROUND

1. Technical Field

The present invention relates to sulfide-based lithium-ion-conducting solid electrolyte glass, all-solid lithium secondary batteries, and methods for manufacturing all-solid lithium secondary batteries.

2. Related Art

Along with development of portable equipments such as personal computers and cellular phones, demand for small-sized lightweight secondary batteries as power sources of the portable equipments shows a drastic increase in recent years. Among such secondary batteries, in particular, lithium secondary batteries realize a high energy density since lithium has a reduced atomic weight and increased ionization energy. Extensive research has been made on such batteries, and as a result, the lithium secondary battery is presently used in a wide range of applications including a power source of the portable equipments. Such lithium secondary batteries may be roughly divided, according to the kind of electrolyte, into lithium ion batteries using liquid electrolyte, lithium ion polymer batteries using polymer solid electrolyte, and lithium ion batteries using inorganic lithium-ion-conducting solid electrolyte.

Among the lithium ion batteries described above, the all-solid lithium secondary battery typically has a structure shown in FIG. 1. Specifically, a positive electrode (I) is inserted in an insulating cylindrical tube 104 composed of polypropylene resin. The positive electrode (I) is formed by compression-molding positive electrode mixed material 103 composed of positive electrode active material and solid electrolyte powder in a metal mold under a pressure of about 4 tons/cm$^2$. In this instance, a positive electrode current collector 102 electrically bonded to a positive electrode lead plate 101 is inserted in the positive electrode (I). Also, a negative electrode (II) is formed by compression-molding negative electrode mixed material 107 composed of negative electrode active material and electrolyte powder, with a negative electrode current collector 106 inserted in the negative electrode mixed material 107. A lithium-ion-conducting solid electrolyte layer 108 is placed between the positive electrode (I) and the negative electrode (II), and the entire structure is subject to a compression in a press machine, whereby the positive electrode layer, the electrolyte layer and the negative electrode layer are integrated, thereby forming an all-solid lithium secondary battery device.

The lithium-ion-conducting solid electrolyte layer 108 may be formed from sulfide-based lithium-ion-conducting solid electrolyte mixed with α-alumina ($Al_2O_3$), a material that can improve the ion conductivity of sulfide-based lithium-ion-conducting solid electrolyte that is a base material. It is known that all-solid lithium secondary batteries using such electrolyte layers exhibit improved charge-discharge cycle characteristics. The battery device is formed in a manner that the positive electrode (I) and the negative electrode (II) are filled in the insulating polypropylene resin cylindrical tube 104 under pressure, and strongly tightened with bolts and nuts through insulating tubes for preventing short-circuit between the positive electrode (I) and the negative electrode (II) by press forming metal molds which also serve as electrode terminals. It is noted that the manufacturing process described above is conducted in a dry inert gas atmosphere in a room temperature area.

Also, for the sulfide-based lithium-ion-conducting solid electrolyte 108 used in the battery device described above, sulfide-based lithium-ion-conducting solid electrolyte is mainly used, and crystal and amorphous electrolyte are used as the electrolyte. Battery devices manufactured with such materials are in a state in which the entire body of the battery device is pressurized, compressed and strongly consolidated within the insulating cylindrical tube 104. As a result, it becomes possible to avoid bonding failures at the bonding interfaces between the electrode active materials and the electrolyte powder which may be generated with volume expansion and contraction of the electrode active materials through battery's charge-discharge cycles. Accordingly, a reduction in the battery discharging capacity through charge-discharge cycles can be prevented, and the battery device exhibits excellent characteristics. If the battery device are not strongly confined in the insulating cylindrical tube 104, the battery discharging capacity would considerably reduce with its charge-discharge cycles.

As an example of another all-solid lithium secondary battery, S. D. Jones and J. R. Akridge, J. Power Sources, 43-44, 505 (1993) discloses an all-solid thin film lithium secondary battery produced by sequentially forming a negative electrode thin film, an electrolyte thin film and a positive electrode thin film through the use of a deposition apparatus or a sputtering apparatus. It is reported that the thin film lithium secondary battery exhibits superior charge-discharge cycle characteristics of several thousand cycles or more. The battery is made of a single thin plate of electrolyte formed by deposition without having grain boundaries within the electrolyte layer, such that migration of lithium ions is not influenced by bonding grain boundaries of the electrolyte particles, which makes it difficult for grain boundary junction failures to occur against volume expansion and contraction through charging and discharging operations of the electrode active materials, such that the thin film lithium secondary battery exhibits superior charge-discharge cycle characteristics.

However, in the all-solid lithium secondary battery described above, the solid electrolyte in the electrolyte layer and the electrode layers is formed from electrolyte powder particles being simply consolidated by compressive pressure, and therefore particles exist at their contact interfaces, and their bonding force is weak. In particular, when the all-solid lithium secondary battery is quickly charged, differences are generated in the current density distribution within the battery. Portions having strong current density distribution would cause a very large change in the electrode volume, which cause electronic bond failures at the bonding interface between the electrode active material and the electrolyte particles.

Also, in battery systems that use reversible deposition reaction of metal lithium as the reaction of negative electrode active material, lithium ions would deposit in lithium metal dendrites at bonding grain boundaries among the electrolyte powder particles within the electrolyte layer. As a result, this type of all-solid lithium secondary battery eventually has lowered charge-discharge current density and its capacity also gradually reduces along with charge-discharge cycles. Furthermore, the dendrite lithium metal expands bonding interfaces among electrolyte particles, and deposits in the bonding interfaces, which lead to various problems, such as, electrical short-circuit between the positive electrode and the negative electrode, and the like.

Furthermore, in order to make the all-solid thin film lithium secondary battery devices to be abundantly practical, they should have a higher capacity. In order to achieve this, the amount of electrode active material to be used needs to be increased while maintaining the ion-conducting paths within the electrode layers. If the electrode layer is to be made thicker by using the same technology, without changing the configuration of the electrode, the electrode resistance becomes greater. In order to lower the resistance, ion-conducting electrolyte material needs to be deposited among the electrode active material simultaneously when depositing the electrode. As a result, this process would not only increase the deposition time, but also require an expensive apparatus, such as, a multi-source deposition apparatus for deposition, such that the cost of manufacturing the all-solid thin film lithium secondary batteries becomes substantial. It is extremely difficult to increase the amount of electrode active material by the conventional deposition methods, and practical lithium secondary batteries with high energy cannot be provided at low costs.

In order to solve the problems described above, lithium-ion-conducting electrolyte layers to be used are provided with flexibility, thereby providing the layers with improved workability. In this respect, organic polymer binder is added to the electrolyte powder used in the structure of lithium-ion-conducting electrolyte layer, which is formed into a flexible sheet. A variety of such sheets have been studied, but in any of the solid electrolyte sheets formed, grain boundaries are present at bonding interfaces among electrolyte particles. When all-solid lithium secondary batteries are formed with such a solid electrolyte sheet, the phenomenon described above occurs in charge-discharge cycles, and in particular, deep charge-discharge cycles of the batteries manufactured, in which the current density distribution varies within the battery, and portions having strong current density distribution would cause a very large change in the electrode volume, which cause electronic junction failures at the bonding interfaces of particles between the electrode active material and the electrolyte.

Also, in battery systems that use reversible deposition reaction of lithium metal as the reaction of negative electrode active material, lithium ions would deposit in lithium metal dendrites at grain boundaries among the electrolyte powder particles within the electrolyte layer. As a result, this type of all-solid lithium secondary battery eventually has lowered charge-discharge current density along with charge-discharge cycles, and its capacity also gradually reduces along with charge-discharge cycles. Furthermore, the dendrite lithium metal expands bonding interfaces among electrolyte particles, and deposits in the bonding interfaces, which lead to various problems, such as, electrical short-circuit between the positive electrode and the negative electrode, and the like.

Also, in solid electrolyte sheets which are formed with addition of organic polymer binder, the conductivity of lithium ions tends to lower considerably, compared to solid electrolyte single body without any binder added. Therefore, as the lithium-ion-conducting solid electrolyte to be used, those with excellent ion conductivity need to be used. Therefore, for example, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$B_2S_3$—$LiI$, $Li_2S$—$P_2S_5$, $Li_2S$—$P_2S_5$—$LiI$, $Li_2S$—$P_2S_5$-ZmSn (Z=Ge, Zn, Ga)(m is integer except 0)(n is integer except 0), $Li_2S$—$GeS_2$, $Li_2S$—$SiS_2$—$Li_3PO_4$— based sulfide lithium-ion-conducting solid electrolyte glass, crystalline lithium ion conductor including any one of the foregoing compositions, or lithium-ion-conducting solid electrolyte formed from a mixture of the foregoing compositions are used. Above all, multi-source based lithium ion conducting solid electrolyte materials other than $Li_2S$—$B_2S_3$ and $Li_2S$—$P_2S_5$ have been studied, because they exhibit excellent lithium ion conductivity. However, most of them include semiconductor material or halogenated lithium, such as, Si, Ge, LiI and the like as constituent materials.

Among sulfide-based lithium-ion-conducting solid electrolyte materials that exhibit excellent ion conductivity, many of those materials contain Si and Ge. When these materials are used as electrolyte in all-solid lithium secondary batteries, in its charge-discharge reactions, particularly at the negative electrode, Si and Ge are reduced near the potential at which reduction of lithium ions into metal lithium advances. Therefore, carbon that is generally used as the negative electrode active material of the lithium ion batteries cannot be used. Accordingly, as the negative electrode active material, indium (In) that is a material having a reversible reaction potential higher than that of lithium has been used. As a result, the operation voltage of the battery thus formed is lower than that of batteries using carbon as a negative electrode material. In other words, compared to batteries using carbon as a negative electrode material, all-solid lithium secondary batteries using In as a negative electrode material are higher in costs and lower in operation voltages.

Also, as sulfide-based lithium-ion-conducting solid electrolyte material, sulfide-based lithium-ion conductor containing lithium iodide may be used as electrolyte of all-solid lithium secondary batteries. In this case, oxidation-reduction reactions of iodine advance around 3.0 V in the charge-discharge reaction, particularly at the positive electrode; and for example, the reaction (at about 4.2 V) occurring when lithium cobalt oxide is used as the positive electrode active material is inhibited. For this reason, material that exhibits potentially high charge-discharge reactions cannot be used as the positive electrode active material, such that all-solid lithium secondary batteries with low operation voltages could only fabricated.

SUMMARY

The inventors of the present application have discovered that it is possible to solve the problems at negative electrodes and positive electrodes described above, by adding and mixing α-alumina in a variety of sulfide-based lithium-ion-conducting materials for improving the ion conductivity of sulfide-based lithium-ion-conducting solid electrolyte, whereby the ion conducting property can be improved, and have been conducting studies and developments on all-solid secondary batteries using such electrolyte. Furthermore, according to the invention, by eliminating grain boundaries among solid electrolyte particles that remain when molding the electrolyte, the problems concerning grain boundary junction at bonding interfaces among electrolyte particles can be improved, and highly practical all-solid lithium secondary batteries with excellent performance can be provided.

In accordance with a first aspect of the invention, a sulfide-based lithium-ion-conducting solid electrolyte glass has sulfide-based lithium-ion-conducting solid electrolyte containing α-alumina.

According to the first aspect, the sulfide-based lithium-ion-conducting solid electrolyte glass is formed through heating and melting a material composed of a mixture of α-alumina and sulfide-based lithium-ion-conducting solid electrolyte, and then rapidly cooling the material, thereby forming vitreous sulfide-based lithium-ion-conducting solid electrolyte. Therefore, ion conduction in the solid electrolyte glass is in disorder (without anisotropy), such that a solid electrolyte layer made of a molded powder formed by using such solid electrolyte glass according to the first aspect can have improved ion conductivity with better electrolyte, better than that of a material obtained by simply mixing the foregoing materials.

According to a second aspect of the invention, in the sulfide-based lithium-ion-conducting solid electrolyte glass recited above, the sulfide-based lithium-ion-conducting solid electrolyte glass may preferably include at least lithium sulfide—phosphorus sulfide and α-alumina, or lithium sulfide—boron sulfide and α-alumina.

Accordingly, the sulfide-based lithium-ion-conducting solid electrolyte glass according to the second aspect can improve the ion conductivity of two-element-base sulfide-based lithium ion conductor composed of lithium sulfide—phosphorus sulfide or lithium sulfide—boron sulfide, which leads to higher operation voltages of all-solid lithium secondary batteries, and to capability of providing highly practical batteries capable of high efficiency discharging.

According to a third aspect of the invention, an all-solid lithium secondary battery uses sulfide-based lithium-ion-conducting solid electrolyte glass containing α-alumina as a solid electrolyte layer.

According to a fourth aspect of the invention, an all-solid lithium secondary battery uses sulfide-based lithium-ion-conducting solid electrolyte glass containing lithium sulfide—phosphorus sulfide and α-alumina, or lithium sulfide—boron sulfide and α-alumina as a solid electrolyte layer.

According to a fifth aspect of the invention, the all-solid lithium secondary battery may use an all-solid lithium secondary battery element in which the solid electrolyte layer is interposed between a pair of electrodes formed from a positive electrode layer and a negative electrode layer.

According to a sixth aspect of the invention, the all-solid lithium secondary battery may use an all-solid lithium secondary battery element in which one of the positive electrode layer and the negative electrode layer may be molded in one piece with the solid electrolyte layer.

According to the sixth aspect, the sulfide-based lithium-ion-conducting solid electrolyte glass containing α-alumina can be used as a solid electrolyte layer of the all-solid lithium secondary battery, whereby the all-solid lithium secondary battery with excellent charge-discharge efficiency can be provided.

According to a seventh aspect of the invention, a method for manufacturing an all-solid lithium secondary battery includes: a processing of manufacturing a sulfide-based lithium-ion-conducting solid electrolyte glass, which includes a first step of heating and melting a mixture of sulfide-based lithium-ion-conducting solid electrolyte containing α-alumina, and a second step of rapidly cooling the mixture that is heated and melted.

According to an eighth aspect of the invention, a method for manufacturing an all-solid lithium secondary battery includes, in addition to the manufacturing method described above, a third step of heating and compressing electrolyte glass powder formed from the sulfide-based lithium-ion-conducting solid electrolyte glass with one of a positive electrode layer and a negative electrode layer, thereby forming an all-solid lithium secondary battery element in which the electrode layer and the electrolyte layer are molded in one piece.

According to the eighth aspect, by heating and compressing the electrolyte glass powder, a vitreous solid electrolyte layer with high ion conductivity with few bonding interfaces among electrolyte powder particles can be obtained. The electrolyte glass powder in a layer is interposed between a pair of electrodes formed from a positive electrode and a negative electrode, and these layers are heated and compressed, whereby an all-solid lithium secondary battery element in which the electrode layers and the electrolyte layer are molded in one piece with fewer bonding grain boundaries in bonding interfaces among electrolyte powder particles and excellent ion conductivity can be formed, and an all-solid lithium secondary battery with excellent charge-discharged cycle characteristics, using the all-solid lithium secondary battery element can be provided.

According to a ninth aspect of the invention, in the method for manufacturing an all-solid lithium secondary battery described above, the heating may preferably be conduced under a temperature condition in the range of glass softening temperature of the sulfide-based lithium-ion-conducting solid electrolyte glass, and the heating may preferably be conducted in a time range in which crystallization of the sulfide-based lithium-ion-conducting solid electrolyte glass does not progress.

According to the ninth aspect of the invention, by the method for manufacturing an all-solid lithium secondary battery described above, the sulfide-based lithium-ion-conducting solid electrolyte glass containing α-alumina is pressure-formed into a layer in its glass softening temperature region, such that a vitreous solid electrolyte layer with few grain boundaries can be readily made. Therefore the ion conductivity of the solid electrolyte layer can be improved. Also, the electrode active material particles and the electrolyte particles are smoothly bonded within the electrodes, such that an all-solid lithium secondary battery element with excellent charge-discharge cycle characteristics can be provided, and an all-solid lithium secondary battery with excellent charge-discharge rate can be provided.

According to a tenth aspect of the invention, in the method for manufacturing an all-solid lithium secondary battery described above, the heating may preferably be conducted between 200° C. and 300° C., within five hours.

It is necessary for the all-solid lithium secondary battery to avoid crystallization of the solid electrolyte layer, and the heating temperature needs to be in a softening temperature region of the electrolyte glass powder placed in a layer, and the heating needs to be conducted within a time period during which the sulfide-based lithium-ion-conducting solid electrolyte glass powder layer does not crystallize. The solid electrolyte glass softens near the glass transition temperature of the solid electrolyte glass or higher. In a temperature region in which crystallization advances, the higher the temperature, the easier the crystallization of electrolyte glass advances, and therefore the heating processing time needs to be shortened accordingly.

The temperature at which the heating is to be conducted may preferably be in a softening temperature region of the sulfide-based lithium-ion-conducting solid electrolyte glass powder layer, preferably between 200° C. and 300° C. The heating may preferably be conducted within a time period during which the sulfide-based lithium-ion-conducting solid electrolyte glass powder layer does not crystallize, which is preferably within five hours as a processing time, in consideration of the battery manufacturing process. By this method, the sulfide-based lithium-ion-conducting solid electrolyte glass layer can avoid crystallization, and can be formed with excellent lithium-ion-conducting property. Also, the sulfide-based lithium-ion-conducting solid electrolyte glass powder is placed in a softened state, whereby bonding at bonding surface with other different layers can be smoothed out.

According to an eleventh aspect of the invention, the method for manufacturing an all-solid lithium secondary battery described above may preferably include a fourth step of sealing the all-solid lithium secondary battery element with low melting point glass whose softening temperature is 350° C. or below.

According to the eleventh aspect, the method for manufacturing an all-solid lithium secondary battery described above is equipped with the step in which the all-solid lithium secondary battery element is surrounded by low melting point glass, whereby the sealing treatment on all-solid lithium secondary batteries that are humidity-phobic batteries becomes possible, entry and mixing of moisture in the process for manufacturing all-solid lithium secondary batteries can be avoided, and a reduction in the battery performance can be prevented, such that the industrial value of the manufacturing process is highly elevated.

According to a twelfth aspect of the invention, in the method for manufacturing an all-solid lithium secondary battery described above, the low melting point glass may preferably be glass made of four compositions, $V_2O_5$, ZnO, BaO and $TeO_2$.

According to the twelfth aspect of the invention, in the method for manufacturing an all-solid lithium secondary battery, use of low melting point glass that is made of four compositions, $V_2O_5$, ZnO, BaO and $TeO_2$, may preferably be selected, because the use of such glass would make the performance of a battery to be manufactured less likely to be lowered in the process of heating and compressing treatment of the all-solid lithium secondary battery. According to this method, it is possible to avoid crystallization of the sulfide-based lithium-ion-conducting solid electrolyte glass layer due to the heat transition at the time of melting the low melting point glass, whereby a reduction in the ion conductivity of the electrolyte layer can be prevented.

According to a thirteenth aspect of the invention, in the method for manufacturing an all-solid lithium secondary battery described above, the first step, the second step, the third step and the fourth step may be continuously processed in a dry inert gas atmosphere.

According to the thirteenth, aspect of the invention, the method for manufacturing an all-solid lithium secondary battery is equipped with forming steps of forming a sulfide-based lithium-ion-conducting solid electrolyte glass layer, a positive electrode layer and a negative electrode layer, respectively, and each of the steps and the step of integrating these layers are continuously processed in a dry inert gas atmosphere.

In this manner, an all-solid lithium secondary battery in accordance with an aspect of the invention includes a pair of a positive electrode and a negative electrode, and a sulfide-based lithium-ion-conducting solid electrolyte glass layer provided between the positive electrode and the negative electrode, and is manufactured by any one of the methods described according to the seventh aspect through the thirteenth aspect of the invention.

In manufacturing the all-solid lithium secondary battery, the sulfide-based lithium-ion-conducting solid electrolyte glass containing α-alumina is used, and a layer made of powder of the electrolyte glass may be interposed at least between the positive electrode layer and the negative electrode layer or may be laminated with at least one of the positive electrode layer and the negative electrode layer, heated and compressed together, thereby integrating these layers in one piece. By this process, the heterogeneous layers are more densely bonded at their bonding interfaces, such that, in the charge-discharge performance of the all-solid lithium secondary battery manufactured, the charge-discharge current density can be made larger. At the same time, bonding interfaces among electrolyte powder particles can be eliminated in the electrolyte glass layer.

As a result, in particular, in battery systems that use reversible deposition reaction of metal lithium as the negative electrode reaction, deposition of metal lithium in dendrites at the negative electrode boundaries which would likely occur at the time of overcharging may be prevented. As a result, electrical short-circuit between the positive electrode and the negative electrode can be avoided. The process of integrating such heterogeneous layers by heating and compressing the layers is relatively easy, and as for the performance of all-solid lithium secondary batteries manufactured, battery products with excellent charge-discharge cycle life can be provided, whereby manufacture of all-solid lithium secondary batteries with high industrial values is made possible.

By using sulfide-based lithium-ion-conducting solid electrolyte containing α-alumina, sulfide-based lithium-ion-conducting solid electrolyte glass with excellent lithium-ion-conducting property can be formed, which is better than sulfide-based lithium-ion-conductor alone, Here, a mixture of sulfide-based lithium-ion-conducting solid electrolyte containing α-alumina is heated and melted, and the melted liquid is rapidly cooled, thereby manufacturing sulfide-based lithium-ion-conducting solid electrolyte glass. A solid electrolyte layer composed of electrolyte glass powder that is made from the sulfide-based lithium-ion-conducting solid electrolyte glass containing α-alumina and at least one of the positive electrode layer and the negative electrode layer are laminated, heated and compressed, thereby integrating them in one piece. As a result, the heterogeneous layers at their interface can be densely bonded, and the charge-discharge current density in the performance of the battery thus manufactured can be increased.

Furthermore, when composing an all-solid lithium secondary battery, the use of sulfide-based lithium-ion-conducting solid electrolyte containing α-alumina without containing Si or Ge, such as, for example, $Li_2S$—$P_2S_5$, $Li_2S$—$B_2S_5$ and the like is preferable, as it becomes possible to use the reversible deposition reaction of metal lithium as a reaction at the negative electrode.

Moreover, as the above-described electrolyte does not contain halides, such as, lithium iodide and the like, the reaction at the positive electrode is not influenced by oxidation-reduction reaction of halides, and therefore the use of electrode active material that exhibits a high level of charge-discharge reaction can be made possible, which makes the battery to be more preferable. Inside the electrolyte layer of the battery that is manufactured with the material described above, bonding of interfaces among electrolyte powder particles is eliminated. In particular, in battery systems that use reversible deposition reaction of metal lithium as the negative electrode reaction, deposition of metal lithium in dendrites at the negative electrode boundaries which would likely occur at the time of overcharging may be prevented. As a result, electrical short-circuit between the positive electrode and the negative electrode can be avoided.

The process of integrating such heterogeneous layers by heating and compressing the layers is relatively easy, and as for the performance of all-solid lithium secondary batteries manufactured, battery products with excellent charge-discharge cycle life can be provided, whereby manufacture of all-solid lithium secondary batteries with high industrial values is made possible. Also, manufacture of the sulfide-based lithium-ion-conducting solid electrolyte glass used in the invention is made possible, as a result of the studies on vitrification of mixed electrolyte base material made of sulfide-based lithium-ion-conducting solid electrolyte that had been proposed by the inventors mixed with α-alumina. The mixed electrolyte containing α-alumina described can be entirely vitrified, and the use of the vitrified sulfide-based lithium-ion-conducting solid electrolyte makes it possible to manufacture all-solid lithium secondary batteries with excellent battery performance.

According to a fourteenth aspect of the invention, a method for integrally forming an electrode and an electrolyte layer in one piece relates to forming an all-solid lithium secondary battery element having a solid electrolyte layer made of the sulfide-based lithium-ion-conducting solid electrolyte glass described above in at least one of the first aspect and the second aspect of the invention, interposed between a pair of electrodes composed of at least a positive electrode and a negative electrode. Accordingly, a layer composed of electrolyte glass powder made of the sulfide-based lithium-ion-conducting solid electrolyte glass described above in at least one of the first aspect and the second aspect together with at least one of a positive electrode layer and a negative electrode layer are heated and compressed, whereby the all-solid lithium secondary battery element having the electrode layer and the electrolyte layer molded in one piece can be formed.

By heating and compressing the electrolyte glass powder made of the sulfide-based lithium-ion-conducting solid electrolyte glass containing α-alumina, particle-to-particle bonding interfaces in the electrolyte powder are eliminated, and a piece of a vitreous solid electrolyte layer with improved ion conductivity can be obtained. For this reason, by using the method for integrally forming an electrode and an electrolyte layer in one piece, the electrolyte glass powder is placed in a layer between a pair of electrodes composed of a positive electrode and a negative electrode of an all-solid lithium secondary battery, and heating and compression steps are applied to the layers to integrally mold the electrodes and the electrolyte layer in one piece, whereby an all-solid lithium secondary battery element equipped with the solid electrolyte layer composed of solid electrolyte glass with excellent ion conductivity can be formed. By using the all-solid lithium secondary battery element in an all-solid lithium secondary battery, excellent charge-discharge cycle performance can be added to the all-solid lithium secondary battery.

According to a fifteenth aspect of the invention, in the method for integrally forming an electrode and an electrolyte layer in one piece, the heating may preferably be conduced under a temperature condition in the range of glass softening temperature of the sulfide-based lithium-ion-conducting solid electrolyte glass, and the heating may preferably be conducted in a time range in which crystallization of the sulfide-based lithium-ion-conducting solid electrolyte glass does not progress.

According to the method for integrally forming an electrode and an electrolyte layer in one piece, the sulfide-based lithium-ion-conducting solid electrolyte glass containing α-alumina is press-formed in a layer in its softening temperature region, whereby a plate-like glass solid electrolyte layer without grain boundaries can be readily formed.

According to a sixteenth aspect of the invention, in the method for integrally forming an electrode and an electrolyte layer in one piece, the heating may preferably be conducted between 200° C. and 300° C., within five hours.

In the method for integrally forming an electrode and an electrolyte layer in one piece it is necessary to avoid crystallization of the solid electrolyte layer in the all-solid lithium secondary battery element, and the heating temperature needs to be in a softening temperature region of the layer of sulfide-based lithium-ion-conducting solid electrolyte glass powder, but needs to be conducted within a time period during which the sulfide-based lithium-ion-conducting solid electrolyte glass powder layer does not crystallize. The solid electrolyte glass softens near the glass transition temperature of the solid electrolyte glass or higher. In a temperature region in which crystallization advances, the higher the temperature, the easier the crystallization of electrolyte glass advances, and therefore the heating processing time needs to be shortened accordingly.

The temperature at which the heating is to be conducted may preferably be between 200° C. and 300° C. Also, the heating may preferably be conducted within five hours. By this method, the sulfide-based lithium-ion-conducting solid electrolyte glass layer can avoid crystallization, and can be formed with excellent lithium-ion-conducting property. Also, the sulfide-based lithium-ion-conducting solid electrolyte glass powder is placed in a softened state, whereby bonding at bonding surface with other different layers can be smoothed out.

DESCRIPTION OF EXEMPLARY EMBODIMENTS

Figure 1:
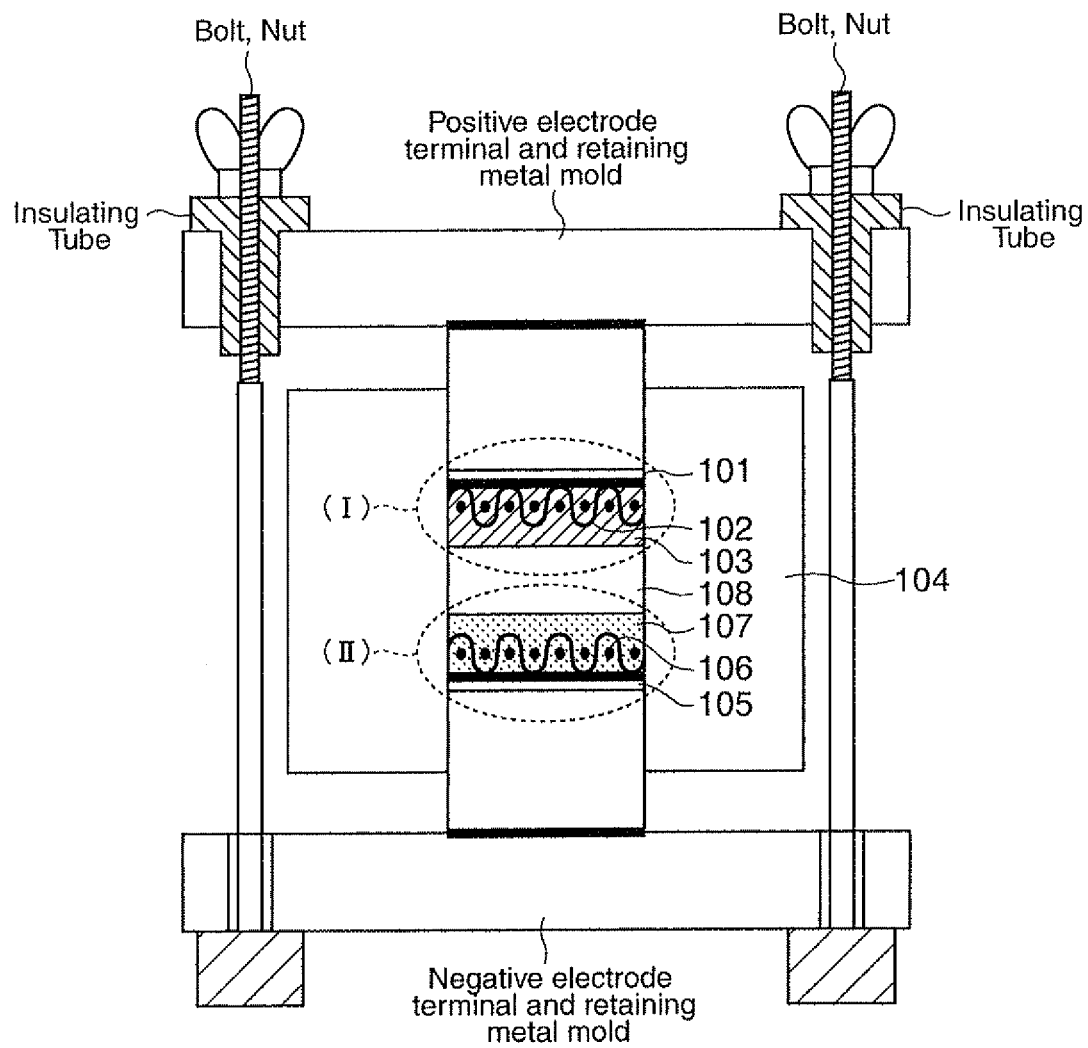
FIG. 1 shows a structure of all-solid lithium secondary battery in related art.

A method for manufacturing an all-solid lithium secondary battery in accordance with an embodiment of the invention is described in detail below. First, a method for making sulfide-based lithium-ion-conducting solid electrolyte glass that is used as an electrolyte layer of the all-solid lithium secondary battery.

First Embodiment

Sulfide-based lithium-ion-conducting solid electrolyte in accordance with a first embodiment is vitreous electrolyte made of sulfide-based lithium-ion-conducting solid electrolyte containing α-alumina, and its base material, lithium-ion-conducting solid electrolyte, may be selected from, for example, $Li_2S$—$SiS_2$, $Li_2S$—$SiS_2$—$LiI$, $Li_2S$—$SiS_2$—$LiBr$, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$B_2S_3$—LiI, $Li_2S$—$P_2S_5$, $Li_2S$—$P_2S_5$—LiI, $Li_2S$—$P_2S_5$-ZmSn (Z=Ge, Zn, Ga))(m is integer except 0)(n is integer except 0), $Li_2S$—$GeS_2$, $Li_2S$—$SiS_2$—$Li_3PO_4$ based sulfide lithium-ion-conducting solid electrolyte glass, crystalline lithium ion conductor including any one of the foregoing compositions, and lithium-ion-conducting solid electrolyte formed from a mixture of selected ones of the foregoing compositions.

Next, α-alumina powder having a grain size of 10 μm or less that is insulating fine particles is mixed in the base sulfide-based lithium-ion-conducting solid electrolyte for use. The α-alumina powder to be used is heated in high vacuum at approximately 250° C. for five hours, whereby moisture that may be adsorbed in their surfaces is removed. Necessary amounts of the materials are weighed, and mixed to form a mixture with the sulfide-based lithium-ion-conductor. The mixture is further mixed and crushed into fine powder by a planetary ball mill. The pot of the planetary ball mill used here is made of aluminum, and balls placed in the pot are alumina balls having diameters of, for example, 5 mm and 10 mm.

Next, when vitrifying the sulfide-based lithium-ion-conducting solid electrolyte and the prepared α-alumina powder, the following two methods may be applied. According to a first method, the prepared sulfide-based lithium-ion-conducting solid electrolyte powder containing α-alumina is filled in a glassy carbon crucible, which is then placed in a vacuum sealed quartz tube, The vacuum ampoule is placed in an electric furnace, and the powder is heated and melted at about 850° C. for about three hours. Then, the vacuum ampoule is placed in ice water, to rapidly quench the melt in the glassy carbon crucible, whereby sulfide-based lithium-ion-conducting solid electrolyte glass containing α-alumina is obtained.

As another vitrification method, according to a second method, the sulfide-based lithium-ion-conducting solid electrolyte powder containing α-alumina is filled in a glassy carbon crucible, the crucible is inserted in a quartz tube within an electric furnace connected to a glove box while flowing dry argon gas therein, where the crucible is heated at about 850° C. for about three hours, thereby melting sulfide-based lithium-ion-conducting solid electrolyte powder containing α-alumina. Then the crucible is removed from the quartz tube, and the melt in the crucible is poured onto a twin-roller device made of stainless steel provided within the glove box, thereby rapidly quenching the melt, whereby sulfide-based lithium-ion-conducting solid electrolyte glass can be formed. In the rapid quenching of the melt, the melted state shifts to a softening temperature region, where the material stays in a soft and flexible plate, and then the material reaches the glass transition temperature or below, where the material becomes to be a piece of hard plate glass, whereby desired sulfide-based lithium-ion-conducting glass can be obtained.

The entire vitrification process by these twin rollers uses an electric furnace installed in a dry box containing a dry argon atmosphere, and the entire process of preparation of the sample materials is treated in the dry box. The sulfide-based lithium-ion-conducting solid electrolyte thus formed is crushed into powder, the powder is filled in a forming metal mold made of alumina in a cylindrical shape having a diameter of 1 cm, and the powder is pressure-molded under a pressure of about 2 tons 1 cm², while the metal mold is heated at a softening temperature of the formed sulfide-based lithium-ion-conducting solid electrolyte glass (about 200° C.-320° C.) A male metal mold for molding used in this example is made of stainless steel plated with gold. The molded piece is cooled to room temperature, and the ion conductivity thereof is measured under the same pressure.

The sulfide-based lithium-ion-conducting solid electrolyte glass in accordance with the first embodiment is described in greater detail below, using embodiment examples.

Embodiment Example 1

As the sulfide-based lithium-ion-conductor that is a starting base material, lithium-ion-conducting glass composed of $Li_2S$—$SiS_2$—$Li_3PO_4$ is used, and the first method described above is used to form novel sulfide-based lithium-ion-conducting solid electrolyte glass that contained α-alumina as insulating powder particles mixed in a weight ratio of about 7%.

The obtained sulfide-based lithium-ion-conducting solid electrolyte glass is crushed into powder having an average particle size of about 7 micron by a planetary ball mill; and the obtained solid electrolyte powder is filled in cylindrical molding jigs made of alumina each having a diameter of 1 cm which also served as an ion conductivity measuring cell, and is pressure-molded under a pressure of about 2 tons 1 cm². At the time of the pressure application, the pressure-molding is conducted, while the jigs are heated (treated for a heating time within 2 hours) to the softening temperature range (about 200° C. 320° C.) of the sulfide-based lithium-ion-conducting solid electrolyte glass. In this process, the male metal molds for molding used are made of stainless steel plated with gold. Then, in succession, while the pressurized state is maintained, the ion conductivity is measured after the measurement cells are cooled to room temperature.

Embodiment Example 2

In this embodiment example, electrolyte glass molded plates are similarly formed to investigate the relation between the heating temperature and the heating time, in heating and compression molding of electrolyte glass used in Embodiment Example 1, and their conductivity is measured, and their external appearance is examined. However, the molding pressure used in this example is the same as Embodiment Example 1, which is about 2 tons/cm²

Embodiment Example 3

As the sulfide-based lithium-ion-conductor that is a starting base material, lithium-ion-conducting glass composed of $Li_2S$—$Ge_2S_2$—$P_2S_5$ is used, and the first method described above is used to form novel sulfide-based lithium-ion-conducting solid electrolyte glass that contained α-alumina as insulating powder particles mixed in a weight ratio of about 7%.

The obtained sulfide-based lithium-ion-conducting solid electrolyte glass (hereafter also referred to as electrolyte glass) is crushed into powder having an average particle size of about 7 micron by a planetary ball mill; and the obtained solid electrolyte powder is filled in cylindrical metal molds made of alumina each having a diameter of 1 cm which also served as an ion conductivity measuring cell, and pressure-molded under a pressure of about 2 tons/cm², while the metal mold is heated (treated for a heating time within 2 hours) to the softening temperature of the formed sulfide-based lithium-ion-conducting solid electrolyte glass (about 220° C.). In this process, the male metal molds for molding used are made of stainless steel plated with gold. Then, in succession, while the pressurized state is maintained, the ion conductivity is measured after the measurement cells are cooled to room temperature.

Embodiment Example 4

As the sulfide-based lithium-ion-conductor that is a starting base material, lithium-ion-conducting glass composed of $Li_2S$—$P_2S_5$ is used, and the first method described above is used to form novel sulfide-based lithium-ion-conducting solid electrolyte glass that contained α-alumina as insulating powder particles mixed in a weight ratio of about 7%.

The obtained electrolyte glass is crushed into powder having an average particle size of about 7 micron by a planetary ball mill; and the obtained solid electrolyte powder is filled in cylindrical metal molds made of alumina each having a diameter of 1 cm which also served as an ion conductivity measuring cell, and pressure-molded under a pressure of about 2 tons/cm$^2$, while the metal molds are heated (treated for a heating time within 2 hours) to the softening temperature of the formed sulfide-based lithium-ion-conducting solid electrolyte glass (about 220° C.). In this process, the male metal molds for molding used are made of stainless steel plated with gold. Then, in succession, while the pressurized state is maintained, the ion conductivity is measured after the measurement cells are cooled to room temperature. After the measurement of the ion conductivity is completed, the solid electrolyte pellets are removed from the measurement cells.

Embodiment Example 5

As the sulfide-based lithium-ion-conductor that is a starting base material, lithium-ion-conducting glass composed of $Li_2S$—$P_2S_5$—$LiI$ is used, and the first method described above is used to form novel sulfide-based lithium-ion-conducting solid electrolyte glass that contained α-alumina as insulating powder particles mixed in a weight ratio of 7%.

The obtained electrolyte glass is crushed into powder having an average particle size of about 7 micron by a planetary ball mill; and the obtained powder is filled in cylindrical metal molds made of alumina each having a diameter of 1 cm which also served as an ion conductivity measuring cell, and pressure-molded under a pressure of about 2 tons/cm$^2$, while the metal molds are heated (treated for a heating time within 2 hours) to the softening temperature of the formed sulfide-based lithium-ion-conducting solid electrolyte glass (about 220° C.). In this process, the male metal molds for molding used are made of stainless steel plated with gold. Then, in succession, while the pressurized state is maintained, the ion conductivity is measured after the measurement cells are cooled to room temperature. After the measurement of the ion conductivity is completed, the solid electrolyte pellets are removed from the measurement cells.

Embodiment Example 6

As the sulfide-based lithium-ion-conductor that is a starting base material, lithium-ion-conducting glass composed of $Li_2S$—$B_2S_3$ is used, and the first method described above is used to form novel sulfide-based lithium-ion-conducting solid electrolyte glass that contained α-alumina as insulating powder particles mixed in a weight ratio of about 5%.

The obtained electrolyte glass is crushed into powder having an average particle size of about 7 micron by a planetary ball mill; and the obtained solid electrolyte powder is filled in cylindrical metal molds made of alumina each having a diameter of 1 cm which also served as an ion conductivity measuring cell, and pressure-molded under a pressure of about 2 tons/cm$^2$, while the metal molds are heated (treated for a heating time within 2 hours) to the softening temperature (about 220° C.) of the formed sulfide-based lithium-ion-conducting solid electrolyte glass. In this process, the male metal molds for molding used are made of stainless steel plated with gold. Then, in succession, while the pressurized state is maintained, the ion conductivity is measured after the measurement cells are cooled to room temperature. After the measurement of the ion conductivity is completed, the solid electrolyte pellets are removed from the measurement cells.

All-Solid Lithium Secondary Battery

Next, all-solid lithium secondary batteries in accordance with a second embodiment of the invention, equipped with the novel sulfide-based lithium-ion-conducting glass, are described.

Second Embodiment

All-solid lithium secondary batteries are equipped with sulfide-based lithium-ion-conducting solid electrolyte formed in a layer composed of sulfide-based lithium-ion-conducting solid electrolyte glass.

Figure 2:
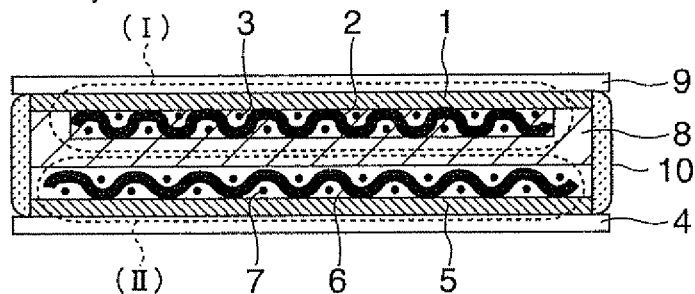
FIG. 2 is a schematic cross-sectional view showing the structure of an all-solid lithium secondary battery in accordance with an aspect of the invention.

FIG. 2 is a longitudinal cross-sectional view of an all-solid lithium secondary battery in accordance with the present embodiment. The all-solid lithium secondary battery element shown in FIG. 2 is formed from a positive electrode (I), a negative electrode (II) and a layer of novel sulfide-based lithium-ion-conducting solid electrolyte glass (hereafter also referred to as an electrolyte layer) 8 interposed between the positive electrode and negative electrode. The electrolyte layer 8 interposed is formed in a manner to cover the positive electrode (I) and the negative electrode (II), and a positive electrode lead plate 1 and a negative electrode lead plate 5 may be formed in the same size as or larger than the electrolyte layer 8. Furthermore, an insulating seal section 10 that is provided in a manner to cover generally the entire body (entire circumference) of the battery element as a battery seal section isolates a positive electrode terminal 9 from a negative electrode terminal 4, and seals any holes therein.

Figure 3:
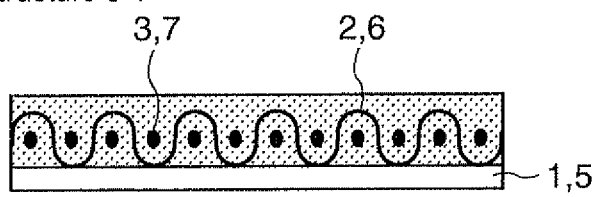
FIG. 3 shows the electrode structures used in batteries in accordance with aspects of the invention.
Figure 3:
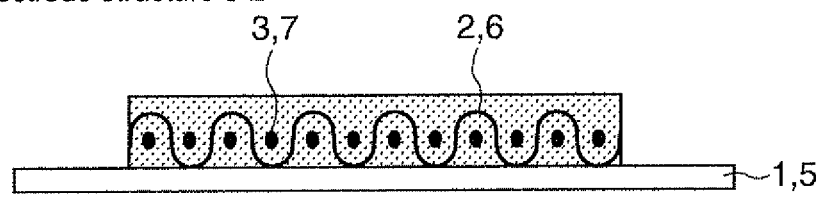
Figure 3:
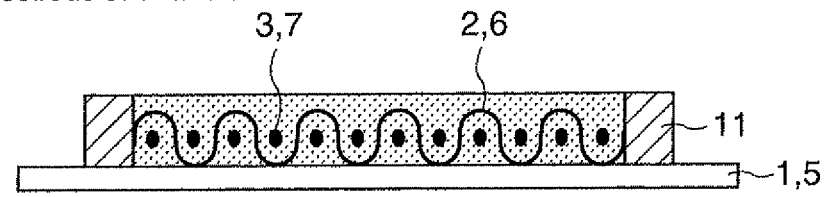

First, the battery element (battery component) having the positive electrode (I), the negative electrode (II) and the electrolyte layer 8 is described. In the present embodiment, the positive electrode (I) and the negative electrode (II) may have generally an identical structure, and therefore the positive electrode (I) alone is described as a representative with reference to FIG. 3. The positive electrode (I) is composed of electrode material that is positive electrode mixed material 3 formed from electrode active material particles and solid electrolyte powder, and conducting agent such as carbon if necessary, mixed together. Similarly, negative electrode mixed material 7 is used for the negative electrode (II). The positive electrode and negative electrode mixed materials 3 and 7 are filled in a positive electrode current collector 2 and a negative electrode current collector 6 (hereafter also referred to as positive electrode/negative electrode current collectors (2, 6)), respectively, each having gaps such as those in conductive mesh materials.

In this instance, the positive electrode/negative electrode current collectors (2, 6) may preferably have not only the effect of providing electron conductivity for making uniform current and lowing internal resistance, but also the effect of giving reinforcement against expansion and contraction phenomenon of the electrodes occurring when the battery is charged and discharged. The positive electrode/negative electrode current collectors 2 and 6 may preferably be affixed and electrically bonded to the positive electrode lead plate 1 and the negative electrode lead plate 5, respectively.

As the composing material for the positive electrode current collector 2 and the positive electrode lead plate 1, for example, electron conducting metal material, such as, Cu, Ni, Ti, SUS and the like, hard resin material, such as, polycarbonate, and insulation material, such as, alumina, glass, ceramics and the like may be used. The composing material needs to withstand the temperatures at the time of heating and compressing the electrolyte glass of the all-solid lithium secondary battery element. When an insulation material is used, a conductive thin film may preferably be provided on the surface thereof.

Figure 4:
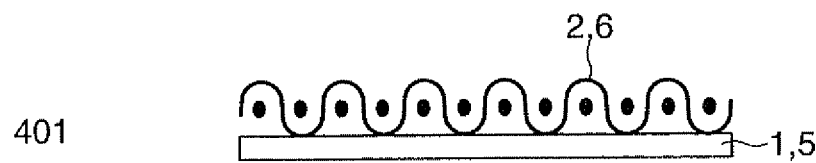
FIG. 4 shows the structure of an electrode current collector used in the invention.
Figure 4:
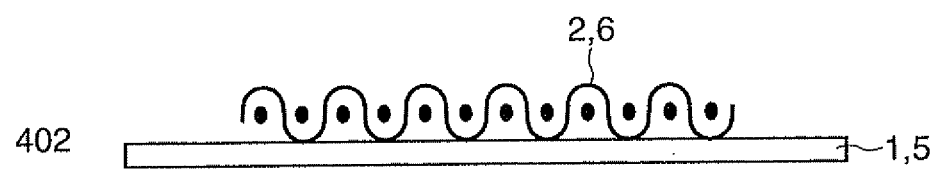
Figure 4:
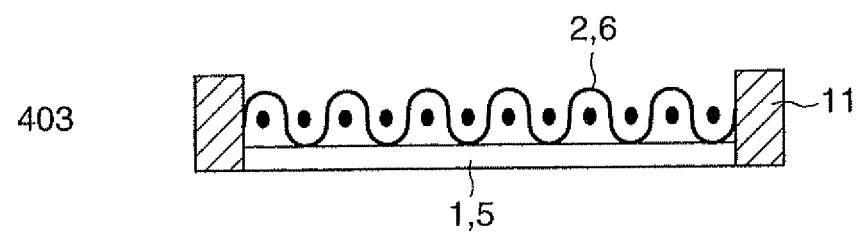
Figure 4:

Current collector structures to be used are shown in FIG. 4. A structure 401 in the figure includes the positive electrode lead plate 1 and the negative electrode lead plate 5 each having a desired dimension, and positive electrode/negative electrode current collectors 2 and 6 composed of metal mesh materials having generally the same size as that of the positive electrode and negative electrode lead plates spot-welded thereto. A structure 402 in the figure includes the positive electrode lead plate 1 and the negative electrode lead plate 5, and positive electrode/negative electrode current collectors 2 and 6 smaller than the positive electrode and negative electrode lead plates spot-welded thereto. Structures 403 and 404 each include structural members having restrictor sections 11 provided on the current collector structures 401 and 402, respectively, in order to add structural strength to the outer circumference sections of the electrode layers to be formed. The structural member may be formed from either insulating material or conductive material, and may be formed as a part of the electrolyte layer 8. For fabrication of electrodes, appropriate one is selected from the current collector structures according to each specific battery structure.

The metal mesh material used as the positive electrode/negative electrode current collectors 2 and 6 may preferably have pores with a pore ratio being about 25%-90%, and more preferably, about 70-85%, which may vary depending on its composing material, its intended purpose and the like. Further, its average thickness may preferably be about 10-400 μm, and more preferably, about 50-300 μm. In the electrodes of the present embodiment, the positive electrode/negative electrode mixed material 3 and 7 are filled in the positive electrode/negative electrode current collectors 2 and 6, respectively, in a manner to cover generally the entire surfaces of the positive electrode/negative electrode current collectors 2 and 6, respectively.

The positive electrode lead plate 1 and the negative electrode lead plate 5 to be used in this embodiment may each preferably have a thickness of about 300-500 μm. As the positive electrode/negative electrode mixed material 3 and 7, for example, electrode active material may be used independently, or mixed material (electrode mixed material) containing electrode active material and solid electrolyte material in combination may be used, and further, conductivity adding material such as carbon or the like mixed with the foregoing material depending on the requirement may be used. As the positive electrode/negative electrode mixed material 3 and 7, mixed material containing electrode active material and solid electrolyte material may preferably be used. As a result, ion-conducting bonding interfaces between particles of the electrode active material and the electrolyte glass powder which constitute the positive electrode (I) and the negative electrode (II) increase, such that the interface bonding force (adhesion) between the electrode layers and the electrolyte layer can be increased. This ensures that ions are smoothly transferred between the electrodes and the electrolyte layer 8, whereby the characteristics (charge-discharge characteristics) of the all-solid lithium secondary battery can be improved.

The positive electrode active material that may be used in the present embodiment includes: transition metal oxide materials, such as, lithium cobaltate ($Li_xCoO_2$), lithium nickelate ($Li_xNiO_2$), lithium nickel cobaltate ($LiCu_{0.3}Ni_{0.7}O_2$), lithium manganate ($LiMn_2O_4$), lithium titanate ($Li_{4/3}Ti_{5/3}O_4$), lithium manganate compound ($LiM_yMn_{2-y}O_4$, where the M is Cr, Co or Ni), lithium iron phosphate and olivine compound, which is one kind of lithium iron phosphate compound ($Li_{1-x}FePO_4$ and $Li_{1-x}Fe_{0.5}Mn_{0.5}PO_4$); sulfide-based chalcogen compound, such as, $TiS_2$, $VS_2$, FeS and $M.MoS_8$ (where the M is transition metal, such as, Li, Ti, Cu, Sb, Sn, Pb and Ni); and lithium metal oxide containing metal oxide as its skeleton, such as $TiO_2$, $Cr_3O_8$, $V_2O_5$, $MnO_2$ and $CoO_2$. On the other hand, the negative electrode active material may include carbon, metal materials, such as, lithium, indium and aluminum, and alloy of one or more of these metals and lithium, one or more of which may be used independently or in combination.

When the foregoing electrode active material and novel solid electrolyte glass material are mixed and used, the novel solid electrolyte glass material may be composed of a material of the same kind (or an identical material) as or different from the electrolyte layer 8 to be described below, but they may preferably be the same kind (more particularly, identical). This ensures that ions are more smoothly transferred between the positive electrode (I) and the electrolyte layer 8, and the adhesion can be further improved. Also, the mixing ratio between the electrode active material and the solid electrolyte glass material may preferably be about 4:6 to 9:1 by weight, and more preferably, about 5:5 to 8:2 by weight, without any particular limitation thereto.

Also, the electrode active material in particles (in the form of powder) having a grain size of 20 μm or less may preferably be used. The use of such particulate electrode mixed material ensures that the positive electrode/negative electrode mixed material 3 and 7 can be more readily and reliably filled in gap sections of the positive electrode/negative electrode current collectors 2 and 6. An average thickness of the layer of positive electrode/negative electrode mixed material 3 and 7 may preferably be between 30 μm and 500 μm, and more preferably, between 50 μm and 300 μm. When the positive electrode/negative electrode mixed material 3 and 7 is in a thickness less than 30 μm, the network path for electron conduction to the active material within the electrode becomes fewer, which causes fewer output current. On the other hand, when the thickness is more than 500 μm, the ion conduction path from the electrode interface that is in contact with the electrolyte layer 8 becomes longer, which increases the electrode internal resistance, resulting in fewer output current. Accordingly, the electrode has an optimum thickness to provide an all-solid secondary battery with higher charge/discharge performance.

Next, examples of the current collector structure of the positive electrode (I) and the negative electrode (II) are described. The structures are shown in FIG. 4. The positive electrode/negative electrode current collectors 2 and 6 to be used are electrically connected to the positive electrode lead plate 1 and the negative electrode lead plate 5, respectively. The positive electrode current collector 2 or the negative electrode current collector 6 may use a mesh material having electron conductivity. Also, for example, by using a press-formed plate or a plate formed by etching having concaves and convexes, the positive electrode lead plate 1 or the negative electrode lead plate 5 may have a configuration integrated with a current collector. The structures 403 and 404 are each equipped with a restrictor section 11 as reinforcement on the peripheral portion of the electrode, and the reinforcement may be made of an insulating material or a conductive material, and can be commonly provided as a part of the electrolyte layer 8.

In the structures of the positive electrode (I) and the negative electrode (II), the kinds of base members used for the positive electrode (I) and the negative electrode (II) shown in FIG. 4 may be identical with or different from each other. Also, in the present embodiment, an electrolyte layer 8 is provided between the positive electrode (I) and the negative electrode (II), in a manner to cover and contact at least one of the electrodes in its entirety. In the present embodiment, the electrolyte layer 8 is formed through pressure-molding the novel solid electrolyte glass powder, and heating and compressing the same into a plate glass.

Also, the novel solid electrolyte glass particles may preferably have an average grain size of about 1 to 20 μm, and more preferably, about 1 to 10 μm. Use of the solid electrolyte particles having such a grain size ensures that, when an all-solid lithium secondary battery element is finally heated to the softening temperature of the electrolyte glass composing the secondary battery element and compressed, mutual contacts of the solid electrolyte glass particles can be improved, the bonding area between particles of the electrode active material and the electrolyte glass within the electrode can be increased, and the transfer path of the lithium ions can be sufficiently secured, thereby further improving the characteristics of the battery element and the laminated secondary battery formed by using the battery element. Also, the average thickness of the electrolyte layer 8 may preferably be about 10 to 500 μm, and more preferably, about 30 to 300 μm.

According to the present embodiment described above, the battery element is composed in a state in which the electrolyte layer 8 covers the circumference of the positive electrode (I) and the negative electrode (II) described above. Because of the structure of the electrodes formed with the positive electrode/negative electrode mixed material 3 and 7 which contains electrode active material and conductive material such as carbon mixed together, the electrode active material and the conductive material would not fall out, and therefore would not pollute the end surfaces of the battery around the electrolyte layer 8. In other words, the phenomenon to short-circuit between the positive electrode (I) and the negative electrode (II) can be eliminated. The more frequently the short circuit between the electrodes due to the active material separated from the electrodes would occur, the smaller the thickness of the electrolyte layer of the battery element becomes. For example, in the case of a laminated battery that is formed with a plurality of primary cells each composed of a group of thin electrodes and a group of electrolyte layers, even one of the battery elements fails among the composing battery elements, the laminated battery cannot be composed. Therefore, the present embodiment is preferable for laminated batteries as they would be benefited from the effects of the present embodiment.

Furthermore, the positive electrode/negative electrode current collectors 2 and 6, the positive electrode lead plate 1 and the negative electrode lead plate 5 used in the present embodiment may be formed with lead plates having concaves and convexes in their surface. By using the lead plates having such a structure, the concave and convex portions can exhibit the function of filling the positive electrode/negative electrode mixed material 3 and 7 in pores as described above. As a result, the use of the positive electrode lead plate 1 and the negative electrode lead plate 5 having such a structure is advantageous because use of the positive electrode/negative electrode current collectors 2 and 6 may be omitted.

Concave portions and convex portions in the concaves and convexes may each have a transverse cross-sectional shape that is circular, elliptical, triangular, quadrilateral such as rectangular, square and rhombus, polygonal such as pentagonal, hexagonal and octagonal, or irregular. Also, concaves and convexes in two or more different transverse cross-sectional shapes may be mixed and provided in the surfaces of the positive electrode lead plate 1 and the negative electrode lead plate 5. The area of the concave sections occupying the surface of each of the positive electrode lead plate 1 and the negative electrode lead plate 5 may preferably be about 25 to 90%, and more preferably, about 50 to 85% in a plan view.

The convex portions of the positive electrode lead plate 1 and the negative electrode lead plate 5 may preferably have an average height of about 50 to 400 μm, and more preferably, about 100 to 200 μm. By providing the concave portions and the convex portions in the range of such ratios and dimensions, the concave and convex portions can more reliably exhibit the function of current collectors.

Figure 5:
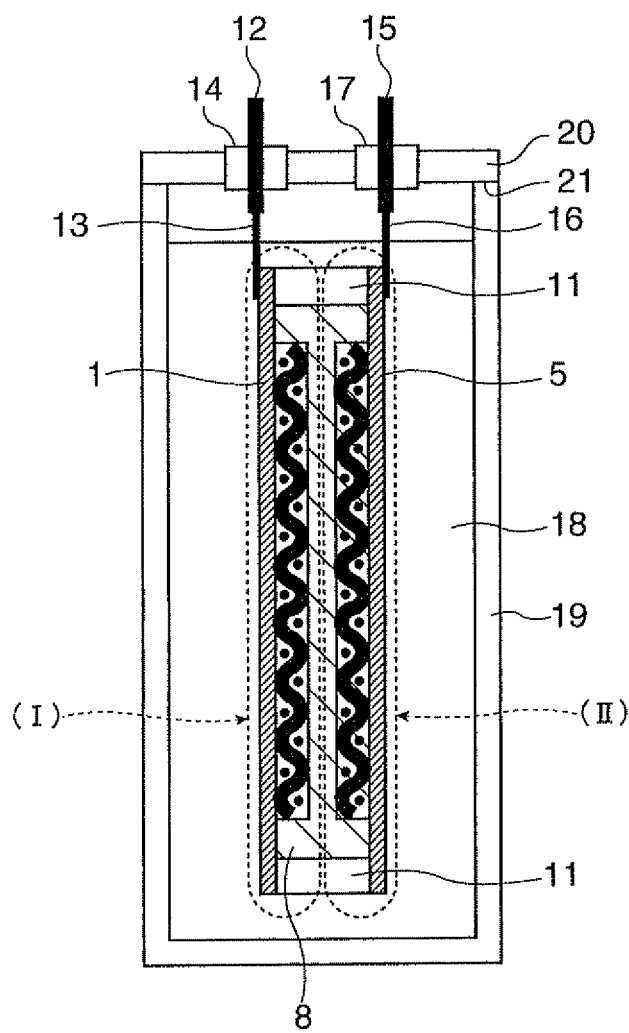
FIG. 5 shows the structure of another all solid lithium battery used in the invention.

Next, FIG. 5 shows an all-solid lithium secondary battery having a different structure in which a battery element is placed in a battery container 19. In this structure, a positive electrode (I) and a negative electrode (II) of the battery element include a positive electrode terminal 12 and a negative electrode terminal 15 for charge and discharge connected to a positive electrode lead plate 1 and a negative electrode lead plate 5 through conductive connection leads 13 and 16, respectively. The electrode terminals 12 and 15 are connected through hermetic electrode terminals 14 and 17 that are pre-installed on a battery container lid 20, the positive electrode and the negative electrode thus connected are inserted in the battery container 19 that is filled with insulating fixing material, and the battery container lid 20 and the battery container 19 are sealed at a joint section 21 by seam welding or with packing material. Accordingly, the positive electrode lead plate 1 and the negative electrode lead plate 5 (hereafter also referred to as positive electrode/negative electrode lead plate 1 and 5) penetrate a fixing section 18.

The fixing section 18 is disposed also in contact with restrictor sections 11 that are provided at the peripheries of the positive electrode and negative electrode, and therefore has a similar function as that of the restrictor sections 11, thereby restricting (maintaining) expansion and contraction in the plane direction of the battery upon charging and discharging the battery. In other words, the fixing section 18 has a function to restrict expansion of the positive electrode (I) and the negative electrode (II) in the plane direction thereof (a direction generally orthogonal to the direction extending from the positive electrode (I) to the negative electrode (II)), and also restricts the resultant expansion of the electrolyte layer 8 in its plane direction interposed between the positive electrode and negative electrode, thereby acting to prevent electronic bonding failures at the bonding interfaces between the electrolyte layer and electrodes.

Generally, in the battery element, the crystal structures of the electrode active material are three-dimensionally deformed (expanded or contracted) in response to the charge-discharge operations. Therefore, for example, in the case of a conventional battery structure or an all-solid lithium secondary battery structure using sulfide-based lithium-ion-conductor which is not provided with the restrictor sections 11 at the electrodes, the crystal structures of the electrode active material are three-dimensionally deformed (or changed) in the charge-discharge operations of the battery. On the other hand, the positive electrode (I) and the negative electrode (II) are heavily deformed (expanded or contracted) in the plane direction thereof but not in the thickness direction thereof.

As a result, portions that protrude from the electrolyte layer 8 are created at the positive electrode (I) and the negative electrode (II). Naturally, the electrolyte layer 8 that exists between the positive electrode and the negative electrode is also extended in the plane direction (or contracted in the reverse reaction). With this deformation, in the extended portions, a bond inhibition phenomenon that breaks or disconnects electronic bond or ion-conducting path to the electrode active material is created, which makes it difficult for an electric current to flow when charging or discharging the battery element. In other words, separations are generated at the bonding interface between the electrode active material and the electrolyte, whereby an electronic bond or an ion conducting path is destroyed. This phenomenon gradually advances as the charge-discharge operations of the secondary battery are repeated. As a result, the battery capacity of the secondary battery gradually lowers, and charging and discharging of the secondary battery eventually become difficult.

In contrast, in the battery element in accordance with the present embodiment, the structure having the restrictor sections 11 and the fixing section 18 that function to restrict expansion of the positive electrode (I) and the negative electrode (II) in their plane direction and also function to restrict the incidental expansion of the electrolyte layer 8 in its plane direction can preferably be used. Accordingly, the secondary battery can be kept in a shape as close to the initial shape as possible when manufacturing the secondary battery and charging and discharging the same, in other words, the problems described above can be prevented by restricting expansion of the positive electrode (I) and the negative electrode (II) and the electrolyte layer 8 in the plane direction thereof. As a result, it becomes possible to avoid a reduction in the battery capacity which would otherwise occur over the lapse of charge-discharge cycles (by charge-discharge operations in multiple times).

The restrictor sections 11 may be made of an electron conducting material or an insulating material, either of which should be an inert material that does not influence the battery reactions. With this structure, short-circuit between the positive electrode (I) and the negative electrode (II) can be reliably prevented. Examples of the insulating material include various kinds of resin materials, such as, thermoplastic resin, thermosetting resin and photocurable resin, various kinds of glass materials, and various kinds of ceramics materials. It may be preferable that, as the insulating material, any one of thermoplastic resin, thermosetting resin, photocurable resin and low-melting-point glass alone, or a combination of two or more of them may be used. However, the material to be used needs to withstand the temperature when the electrolyte glass of the all-solid lithium secondary battery element is heated and compressed to its softening temperature. Use of the foregoing materials is preferred as they make it possible to form the restrictor sections 11 readily, and help to increase the mechanical strength of the restrictor sections 11.

Examples of the thermoplastic resin include polyolefin, ethylene-vinyl acetate copolymer, polyamide, polyimide and hot-melt resin. Examples of the thermosetting resin include epoxy-based resin, polyurethane-based resin and phenol-based resin. Also, examples of the photocurable resin include epoxy-based resin, urethane acrylate-based resin and vinyl ether-based resin.

The average thickness of the restrictor section 11 (in particular, the average thickness of a side surface thereof) may preferably be about 30 to 500 µm, and more preferably, about 50 to 300 µm, although it may be slightly changed depending on the constituent material and intended use of the restrictor sections 11. By setting the average thickness within this range, it is possible to reliably prevent expansion of the positive electrode (I) and the negative electrode (II) in the plane direction thereof, thereby allowing the restrictor sections 11 to exhibit their function in a reliable manner.

Next, a process of manufacturing an all-solid lithium secondary battery using the members described above is described.

Figure 6:
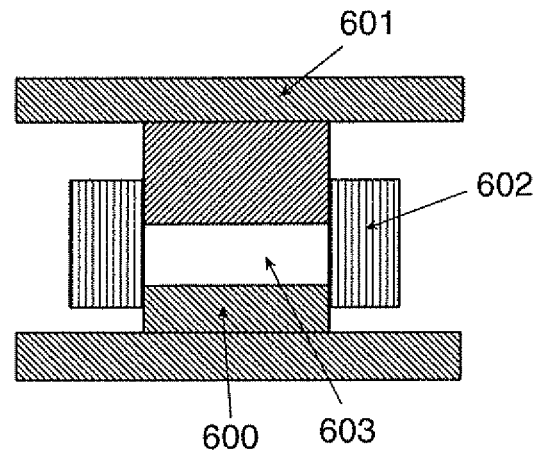
FIG. 6 shows the structure of a metal mold for forming an electrode.

According to a process for fabricating an all-solid lithium secondary battery, for example, a metal mode shown in FIG. 6 may be used. While a lower male forming mold 600 is inserted into a cylindrical hole 603 of a forming metal mold 602, a current collector structure 401 shown in FIG. 4 is inserted in the cylindrical hole 603 in a manner that the positive electrode/negative electrode lead plate (1, 5) is in contact with the lower metal mold. Then, positive electrode/negative electrode mixed material (3, 7) is filled in the cylindrical hole 603, the positive electrode/negative electrode mixed material (3, 7) is leveled, an upper male forming mold 601 is inserted in the cylindrical hole 603, and the positive electrode/negative electrode mixed material (3, 7) is preliminarily pressure-formed. The formed positive electrode/negative electrode mixed material (3, 7) is removed from the mold, and used as a positive electrode/negative electrode.

Figure 7:
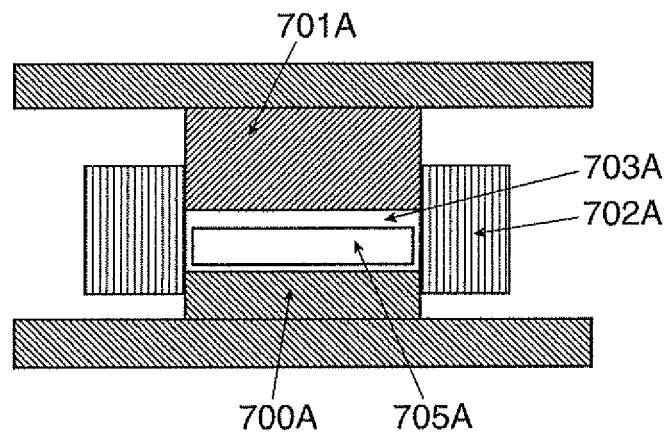
FIG. 7 shows a metal mold for forming of electrode and electrolyte in accordance with an aspect of the invention.
Figure 7:
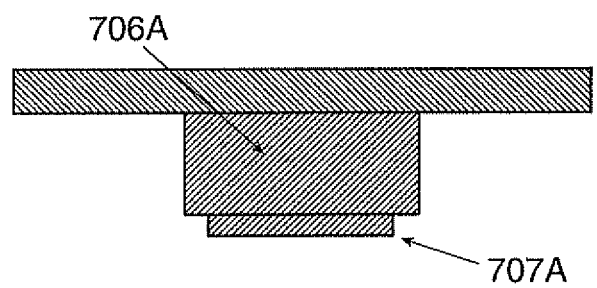
Figure 8:
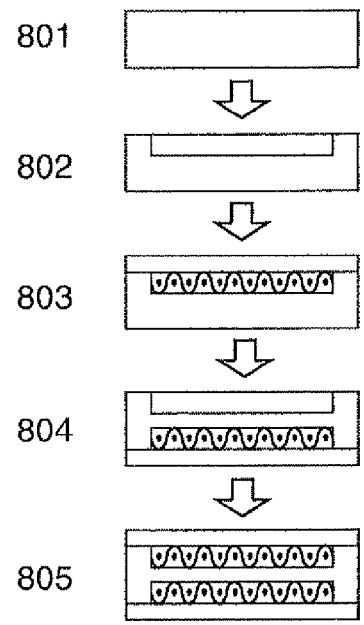
FIG. 8 is a flow chart for fabricating a battery element in accordance with an aspect of the invention.

Then, by using a metal mold shown in FIG. 7, an electrolyte layer and an electrode layer are molded into one piece.

i) First, using the metal mold shown in FIG. 7, electrolyte powder 705A is filled in a cylindrical hole 703A, and the electrolyte powder is leveled. (In this step, the electrolyte layer is in a state 801 shown in FIG. 8.)

ii) Next, as an upper male forming mold, a metal mold 706A equipped with a convex portion for forming a cavity portion for placement of an electrode in an electrolyte layer is inserted in the cylindrical hole 703A, and lightly pressed against the electrolyte layer. (In this step, the electrolyte layer is placed in a state 802 shown in FIG. 8.)

iii) Then, the upper metal mold 706A is removed from the hole 703A, and an electrode (a positive electrode or a negative electrode) that has been fabricated is placed in the concave portion formed in the electrolyte layer in a manner that the electrode active material surface is in contact with the electrolyte layer, which are then preliminarily pressure-formed by an upper male forming mold 701A. (In this step, the electrolyte layer and the electrode layer (positive electrode or negative electrode) are integrated into one piece, in a state 803 shown in FIG. 8.)

iv) Then, the metal mold is turned upside down, and the steps i) to iii) are similarly conducted to bring the layers into a state 804 shown in FIG. 8.

v) Finally, the battery element in accordance with the present embodiment is formed as in a state 805 shown in FIG. 8.

In the process described above, both of the positive electrode and the negative electrode are surrounded by the electrolyte layer, but only one of the electrodes and the electrolyte layer may be integrated into one piece. The integrated formed layers in such a structure shall be used, when further integrally heated and compressed, in fabricating battery elements in which lithium, indium and other low thermal resistance material is compression-bonded or adhered. The pressure used for the pressure-forming steps described above may preferably be 1 ton/cm$^2$ or higher, and more preferably, about 2 tons/cm$^2$. By this, the positive electrode/negative electrode mixed material (3, 7) can be favorably compressed, the positive electrode/negative electrode mixed material (3, 7) can be reliably filled in the gap sections of the positive electrode/negative electrode current collector (2, 6) (see FIG. 4), and an integration process by heating and compression to be succeeded can be conducted more reliably. The variety of forming molds used for manufacturing all-solid lithium secondary batteries are not limited to metal molds, but may be made of resin or ceramics.

Figure 9:
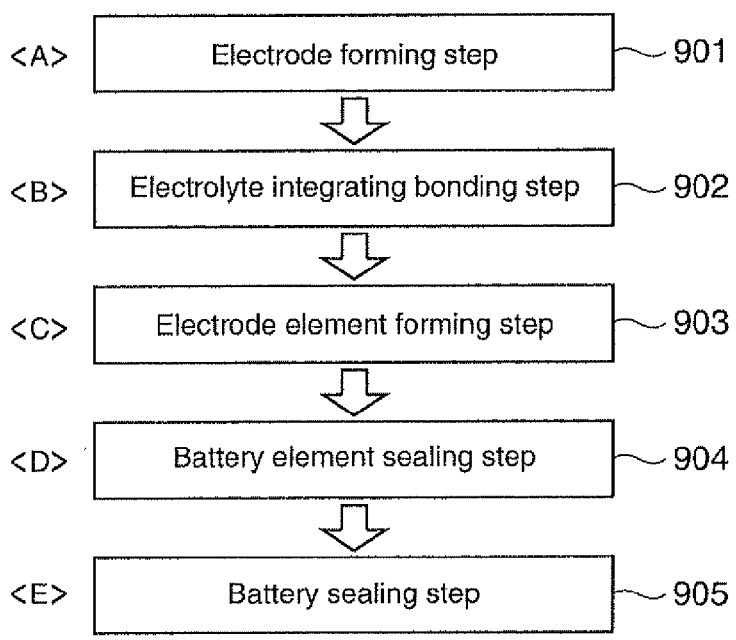
FIG. 9 is a flow chart of a battery forming process.

Next, the method for manufacturing an all-solid lithium secondary battery in accordance with an embodiment of the invention is described in greater detail with reference to a flow chart shown in FIG. 9.

A. Electrode Forming Step 901

First, positive electrode and negative electrode current collectors 2 and 6 necessary for forming electrodes shown in FIG. 4 are prepared in advance.

i) Electrode Forming Step: A positive electrode/negative electrode current collector (2, 6) is placed in the cylindrical hole 603 shown in FIG. 6 is in a manner that the positive electrode/negative electrode lead plate (1, 5) is in contact with the lower male forming mold 600. Then, positive electrode/negative electrode mixed material (3, 7) is filled in the cylindrical hole 603, the filled positive electrode/negative electrode mixed material (3, 7) is leveled, an upper male forming mold 601 is used to form a positive electrode/negative electrode. The formed positive electrode/negative electrode is removed from the metal mold, thereby obtaining electrodes for the battery in accordance with the embodiment of the invention (see Electrode Structure 3-1 in FIG. 3A).

B. Electrolyte Integration Bonding Step 902

Next, as an electrolyte layer forming metal mold, a forming mold having a cylindrical hole 703A with an inner diameter larger than the cylindrical hole 603 used for forming the electrodes is prepared (see FIG. 7). While a lower male forming mold 700A is inserted in the cylindrical hole 703A of the forming mold, electrolyte powder 705A is filled in the cylindrical hole 703A. Then, to form concave/convex sections capable of forming an electrode configuration in the electrolyte layer in the cylindrical hole 703A, an upper male forming mold 706A having a protrusion 707A that conforms to an electrode inserting portion is inserted in the hole 703A, and the electrolyte powder is preliminarily pressure-formed, thereby forming an electrolyte layer equipped with a portion for inserting an electrode. Then, the upper male forming mold 706A is removed, the electrode (for example, a positive electrode) formed in the step A is inserted in the electrode insertion portion formed in the electrolyte layer, the upper male forming mold 701A that does not have a protrusion is inserted in the hole to preliminarily pressure-form the electrolyte layer, whereby the electrolyte layer and the electrode (positive electrode) are integrated in one piece in a manner that the positive electrode is covered by the electrolyte layer (in the state 803 in FIG. 8).

C. Battery Element Forming Step 903

Next, without removing the molded body of the positive electrode and the electrolyte layer integrated in one piece from the forming metal mold, the forming metal mold (see FIG. 7) is turned upside down, the lower male forming mold 700A, which is placed above, is once again removed from the forming metal mold, and the upper male forming mold 706A having the protrusion 707A capable of forming an electrode configuration is inserted again in the forming metal mode, whereby the electrolyte layer having a portion capable of inserting an electrode (negative electrode) is formed by being preliminarily pressure-formed. Then, the upper male forming mold 706A is removed, a terminal electrode (negative electrode) that has been formed in advance is placed in the electrode insertion portion formed in the electrolyte layer, the lower male forming mold 700A that does not have a protrusion is inserted in the cylindrical hole, and by pressure-forming with a predetermined pressure, a primary cell (as in the state 805 of FIG. 8) that becomes a single battery element in which the positive electrode layer and the negative electrode layer are covered by the electrolyte layer can be formed.

The forming in this step is conducted while the electrolyte is heated to its softening temperature region. Accordingly, the pressure to be applied may be about 1 ton/cm$^2$, and more preferably, about 2 tons/cm$^2$ or higher. By this step, the battery element is sufficiently compressed, and the circumference of the positive electrode (I) and the negative electrode (II) within the battery element can be completely covered by the electrolyte layer, and their bonding strength or the interface bonding can be secured. As a result, short-circuit between the positive electrode and the negative electrode within the battery element can be reliably prevented, and the battery with stable battery performance can be formed. Further, mold release agent for improving the mold releasability of the battery element to be formed may be applied to the interior surface of the cylindrical hole 703A of the forming female metal mold 702A used in the steps described above.

D. Battery Element Sealing Step 904

The battery element sealing step is described with reference to the battery element shown in FIG. 2. A metal mold larger than the metal mold shown in 7 is prepared, the positive electrode terminal 9 is placed inside the metal mold, and then the battery element obtained in step C is place thereon. Then, low melting point glass frit whose softening temperature is 350° C. or lower is filled around the inserted battery element, the negative electrode terminal 4 is then inserted therein, and the entire structure is pressurized, whereby a battery element in which the low melting point glass frit is filled around the electrode terminals is formed.

The battery element in this state is heated under pressure to a temperature at which the low melting point glass frit is softened and melted, thereby sealing off the entire battery element (at the sealing section 10). The low melting point glass used in this step is selected from those having the softening temperature between 200° C. and 350° C. Examples of the low melting point glass include PbO—$B_2O_3$—$SiO_2$—$Al_2O_3$-based lead glass. Other low melting point glass that does not contain lead may be used as sealing material in the softening temperature range. However, when the glass contains lead oxide, and the lead oxide electrically contacts the negative electrode interface, reduction action of the negative electrode would readily advance. Moreover, the lead oxide would readily chemically react with sulfur constituents contained in the sulfide-based lithium-ion-conductor present in the battery. Therefore, for enabling an extended use of the battery, unleaded low melting point glass comprised of four constituents, $V_2O_5$, ZnO, BaO and $TeO_2$ is preferred, as its softening temperature is around 320° C.

When the sealing material is used, the entire battery body is heated around 220° C., its entirety is compression-treated within 5 hours, and further the battery sealing section is locally heated, but it is still usable because the sulfide-based lithium-ion-conducting solid electrolyte glass inside does not reach its crystallization temperature.

The step described above can eliminate grain boundaries of electrolyte glass particles within the sulfide-based lithium-ion-conducting solid electrolyte glass layer present in the battery. Furthermore, the step described above functions to smooth out interface junctions between the electrolyte particles and the electrode active material particles within the electrodes, such that the ion-conducting path at the bonding interface can be improved, and the battery output characteristics are expected to improve.

In order to obtain such effects as described above, a reduced pressure heating state may be maintained until the sealing material reaches 60% or higher hardened state, and then the reduced pressure state may be released (or may be pressure-bonded if necessary) thereby sealing the batter element. Also, in order to use the unleaded low melting point glass described above more favorably, a small amount of lead material may be added to the glass to lower the melting point. Furthermore, in order to adjust the thermal expansion of the materials, β-eucryptite, lead titanate, cordierite and the like may be added in the glass frit to be used as filler.

E. Battery Sealing Step 905

This step is conducted when forming a battery having the structure shown in FIG. 5. Examples of a constituent material of the battery container 19 and the battery container lid 20 include various metal materials such as aluminum, copper, bronze and stainless steel, various resin materials, various ceramics material, various glass materials, and composite materials made of metal and various resin, but need to be selected from materials that withstand the softening treatment temperature of electrolyte glass.

In this step, the positive electrode and negative electrode lead plates 1 and 5 of the battery element formed in step D and the positive electrode and negative electrode terminals 12 and 15 are bonded in advance through hermetic electrode terminals 14 and 17 provided on the battery container lid 20, respectively. The battery element in this state is inserted in the container that contains preliminarily prepared hot melt. Then, after cooling the battery container 19, the battery container lid 20 and the battery container 19 are sealed off by pressing with a packing being placed at a bonding section 21 between the battery container lid 20 and the battery container 19.

Hereinafter, the all-solid lithium secondary battery in accordance with the invention will be described in detail with reference to concrete embodiment examples shown in the drawings.

Embodiment Example 7

In this embodiment example, the battery structure of the invention (see FIG. 2), more specifically a battery element having a configuration in which a pair of electrodes having an electrolyte layer interposed between the electrodes covered by the electrolyte layer is manufactured. First, a current collector having a positive electrode lead plate 1 or a negative electrode lead plate 5 (hereafter referred to as a lead plate (1 or 5)) and a positive electrode current collector 2 or a negative electrode current collector 6 bonded together is prepared, and placed in the cylindrical hole 603 shown in FIG. 6 in a manner that the lead plate (1 or 5) is in contact with the lower male forming mold 600, and then positive electrode mixed material 3 or negative electrode mixed material 7 is filled in the cylindrical hole 603. Then, the filled positive electrode/negative electrode mixed material (3, 7) is leveled, which is then pressure-formed by using the upper male forming mold 601 to form the electrode (for example, positive electrode). The formed member is removed from the metal mold, thereby obtaining the electrode for the battery in accordance with the present embodiment of the invention (see Electrode Structure 3-1 in FIG. 3).

In this embodiment example, lithium cobaltate is used as a positive electrode active material, and novel sulfide-based lithium-ion-conductor in a glass powder form having an ion conductivity of $3.2 \times 10^{-3}$ S/cm$^2$ that is formed from three-element sulfide-based lithium-ion-conducting glass composed of $Li_2S$, $SiS_2$ and $Li_3PO_4$ as a base material and α-alumina added thereto by 5% is used as electrolyte. A positive electrode mixed material is prepared by mixing the positive electrode active material and the electrolyte in a ratio of 7:3 by weight, and formed into a positive electrode having a diameter of 16 mm and a thickness of about 250 μm. As the electrolyte layer, the same electrolyte is used, and formed into a layer having a diameter of 18 mm and a thickness of 300 μm. A mixed material is prepared by mixing carbon powder (with a particle size of 5 μm) as a negative electrode active material and the same electrolyte in a ratio of 5:5 by weight, and formed into a negative electrode having a diameter of 16 mm and a thickness of 150 μm. A mesh material having a thickness of 100 μm is used as a current collector material, and a titanium thin film having a thickness of 50 μm is used as the lead plate, such that the thickness of the lead plate is added to the total electrode thickness.

Next, a forming mold (see FIG. 7) with a cylindrical hole having a greater inner diameter than the cylindrical hole 603 of the metal mold used for forming electrodes (see FIG. 6) is prepared as an electrode-electrolyte layer integrating metal mold. While the lower male forming mold 700A is inserted in the cylindrical hole 703A of the forming mold, electrolyte powder 705A is filled in the cylindrical hole 703A.

Then, the upper male forming mold 706A having the protrusion 707A that is capable of forming an electrode configuration in the electrolyte layer is inserted in the cylindrical hole 703A, and the electrolyte powder is preliminarily pressure-formed, thereby forming an electrolyte layer equipped with a portion for inserting an electrode.

Then, the upper male forming mold 706A is removed, the electrode (for example, a positive electrode) formed in advance is inserted in the electrode insertion portion formed in the electrolyte layer, and the upper male forming mold 701A without having a protrusion is inserted in the cylindrical hole to preliminarily pressure-form the electrolyte layer, whereby the electrolyte layer and the electrode (positive electrode) are integrated in one piece in a manner that the circumference of the positive electrode is covered by the electrolyte layer (in the state 803 in FIG. 8).

Next, without removing the molded body of the positive electrode and the electrolyte layer integrated in one piece from the forming metal mold, the forming metal mold (see FIG. 7) is turned upside down, the lower male forming mold 700A, which is placed above, is once again removed from the forming metal mold, and the upper male forming mold 706A having the protrusion 707A capable of forming an electrode configuration is pressed against the electrolyte layer inside the cylindrical hole 703A, thereby preliminarily pressure-forming the electrolyte layer having a portion capable of inserting an electrode (negative electrode). Then, a terminal electrode (negative electrode) that is formed in advance is placed in the electrode insertion portion, the lower male forming mold 700A is inserted in the cylindrical holes and by pressure-forming with a predetermined pressure (3 tons/cm$^2$ in this example), a single battery element (as in the state 805 of FIG. 8) having the circumference of the positive electrode layer and the negative electrode layer covered by the electrolyte layer is formed.

A metal mold larger than the metal mold shown in 7 is prepared, a positive electrode terminal 9 is placed inside the metal mold, and then the battery element thus formed is place thereon in a manner that the positive electrode side of the battery element contacted the positive electrode terminal 9.

Then, low melting point glass frit (in this example, low melting point glass, YEV8-4103 by Yamato Electronic Co., Ltd., comprised of four constituents, $V_2O_5$—ZnO—BaO—$TeO_4$), whose softening temperature is 400° C. or lower, is filled around the inserted battery element, the negative electrode terminal 4 is then inserted therein, and the entire structure is pressurized under a pressure of about 2 tons/cm$^2$, whereby a battery element in which the low melting point glass frit (i.e., a sealing section 10) is filled between and around the electrode terminals is formed. While keeping the battery element in this state, the battery element is heated and compressed at about 310° C. for one hours and then cooled down, whereby an all-solid lithium secondary battery having the structure shown in FIG. 2 is manufactured.

COMPARISON EXPERIMENT 1

To examine the effects of Embodiment Example 7, a battery element, which did not initially have positive electrode/negative electrode terminals 9 and 4 (in the state 805 in FIG. 8), is formed by integral pressure-molding, using exactly the same composing materials as those of the battery element of Embodiment Example 7. In this case, the pressure used in the forming is 4 tons/cm², which is greater than the pressure in Embodiment Example 4. Then, positive electrode/negative electrode terminals 9 and 4 are brought in contact with two ends of the formed battery element, and its circumference is insulated and bonded by epoxy resin, whereby an all-solid lithium secondary battery is manufactured by a conventional method. Charge-discharge cycle characteristics of the battery are investigated with conditions similar to those applied in Embodiment Example 7.

Embodiment Example 8

An all-solid lithium secondary battery is manufactured generally in the same manner as in the case of Embodiment Example 7, except that novel crystalline sulfide-based lithium-ion-conducting solid electrolyte glass composed of sulfide-based lithium-ion-conductor ($Li_2S$—$GeS_2$—$P_2S_5$) containing 5% of α-alumina is used instead of the electrolyte ($\alpha$-$Al_2O_3$, $Li_2S$, $SiS_2$ and $Li_3PO_4$) used in the battery element in Embodiment Example 7.

Characteristics of the manufactured battery are measured by charging the battery up to a charged voltage of 4.2 V at the constant current density of 500 µA/cm², stopping the charge operation at the moment when the electric current became equal to 30 µA, and then, after 30 minutes elapsed from the end of charging, discharging the battery at the constant current density value.

COMPARISON EXPERIMENT 2

To examine the effects of Embodiment Example 8, a battery element, which did not initially have positive electrode/negative electrode terminals 9 and 4 (in the state 805 in FIG. 8), is formed by integral pressure-molding, using exactly the same composing materials as those of the battery element of Embodiment Example 8. In this case, the pressure used in the forming is 4 tons/cm², which is greater than the pressure in Embodiment Example 7. Then, positive electrode/negative electrode terminals 9 and 4 are brought in contact with two ends of the formed battery element, and its circumference is insulated and bonded by epoxy resin, whereby an all-solid lithium secondary battery is manufactured by a conventional method. Charge-discharge cycle characteristics of the battery are measured with conditions similar to those applied in Embodiment Example 7.

Embodiment Example 9

An all-solid lithium secondary battery is manufactured generally in the same manner as in the case of Embodiment Example 7, except that novel sulfide-based lithium-ion-conducting solid electrolyte glass composed of sulfide-based lithium-ion-conductor ($Li_2S$—$P_2S_5$) containing 5% of α-alumina is used. Characteristics of the manufactured battery are measured by charging the battery up to a charged voltage of 4.2 V at the constant current density of 500 µA/cm², stopping the charge operation at the moment when the electric current became equal to 30 µA, and then, after 30 minutes elapsed from the end of charging, discharging the battery at the constant current density value.

COMPARISON EXPERIMENT 3

To examine the effects of Embodiment Example 9, a battery element, which did not initially have positive electrode/negative electrode terminals 9 and 4 (in the state 805 in FIG. 8), is formed by integral pressure-molding, using exactly the same composing materials as those of the battery element of Embodiment Example 9. In this case, the pressure used in the forming is 4 tons/cm², which is greater than the pressure in Embodiment Example 7.

Then, positive electrode/negative electrode terminals 9 and 4 were brought in contact with two ends of the formed battery element, and its circumference was insulated and bonded by epoxy resin, whereby an all-solid lithium secondary battery was manufactured by a conventional method. Charge-discharge cycle characteristics of the battery were measured with conditions similar to those applied in Embodiment Example 7.

Embodiment Example 10

An all-solid lithium secondary battery is manufactured generally in the same manner as in the case of Embodiment Example 7, except that novel crystalline sulfide-based lithium-ion-conducting solid electrolyte glass composed of sulfide-based lithium-ion-conductor ($Li_2S$—$B_2S_5$) containing 5% of α-alumina is used instead of the electrolyte ($\alpha$-$Al_2O_3$, $Li_2S$, $SiS_2$ and $Li_3PO_4$) used in the battery element in Embodiment Example 7. Characteristics of the manufactured battery are measured by charging the battery up to a charged voltage of 4.2 V at the constant current density of 500 µA/cm², stopping the charge operation at the moment when the electric current became equal to 30 µA, and then, after 30 minutes elapsed from the end of charging, discharging the battery at the constant current density value.

COMPARISON EXPERIMENT 4

To examine the effects of Embodiment Example 10, a battery element, which did not initially have positive electrode/negative electrode terminals 9 and 4 (in the state 805 in FIG. 8), is formed by integral pressure-molding, using exactly the same composing materials as those of the battery element of Embodiment Example 10. In this case, the pressure used in the forming is 4 tons/cm², which is greater than the pressure in Embodiment Example 7. Then, positive electrode/negative electrode terminals 9 and 4 are brought in contact with two ends of the formed battery element, and its circumference is insulated and bonded by epoxy resin, whereby an all-solid lithium secondary battery is manufactured by a conventional method. Charge-discharge cycle characteristics of the battery are measured with conditions similar to those applied in Embodiment Example 7.

Embodiment Example 11

The batteries manufactured according to Embodiment Examples 7-10 are subjected to a continuous voltage application test in which a voltage of 4.2 V is continuously applied to the batteries in a high temperature tank at 60° C.

Embodiment Example 12

In this example, a battery is manufactured generally in the same manner as in the case of Embodiment Example 7, except that indium powder is used as negative electrode active material of the battery instead of carbon. Characteristics of the manufactured battery are measured by charging the battery up to a charged voltage of 4.0 V at the constant current density of 500 µA/cm², stopping the charge operation at the moment when the electric current became equal to 30 µA, and then, after 30 minutes elapsed from the end of charging, discharging the battery at the constant current density value.

Embodiment Example 13

In this example, a battery is manufactured generally in the same manner as in the case of Embodiment Example 8, except that indium powder is used as negative electrode active material of the battery instead of carbon. Characteristics of the manufactured battery are measured by charging the battery up to a charged voltage of 4.0 V at the constant current density of 500 µA 1 cm², stopping the charge operation at the moment when the electric current became equal to 30 µA, and then, after 30 minutes elapsed from the end of charging, discharging the battery at the constant current density value.

Embodiment Example 14

In this example, a battery is manufactured generally in the same manner as in the case of Embodiment Example 9, except that indium powder is used as negative electrode active material of the battery instead of carbon. Characteristics of the manufactured battery are measured by charging the battery up to a charged voltage of 4.0 V at the constant current density of 500 μA/cm², stopping the charge operation at the moment when the electric current became equal to 30 μA, and then, after 30 minutes elapsed from the end of charging, discharging the battery at the constant current density value.

Embodiment Example 15

In this example, a battery is manufactured generally in the same manner as in the case of Embodiment Example 9, except that aluminum (Al) powder (having an average grain size of 20 μm) is used as negative electrode active material of the battery instead of carbon. Characteristics of the manufactured battery are measured by charging the battery up to a charged voltage of 4.0 V at the constant current density of 500 μA/cm², stopping the charge operation at the moment when the electric current became equal to 30 μA, and then, after 30 minutes elapsed from the end of charging, discharging the battery at the constant current density value.

Embodiment Example 16

In this example, an all-solid lithium secondary battery is manufactured in the same composition as that of Embodiment Example 9 except that heating and compression conditions applied to the battery element used are changed. While Embodiment Example 9 is treated at 310° C. for one hour, the battery in accordance with the present embodiment example is manufactured with the heating/compression temperature at 350° C., for a treatment time within 30 minutes. Charging and discharging of the manufactured battery is conducted in the same manner as Embodiment Example 9.

Embodiment Example 17

In this example, an all-solid lithium secondary battery is manufactured in the same composition as that of Embodiment Example 9 except that heating and compression conditions applied to the battery element used are changed. While Embodiment Example 9 is treated at 310° C. for one hour, the battery in the present embodiment example is manufactured by heating/compression treatment at a heating temperature of 320° C., for a treatment time of about 5 hours, Charging and discharging of the manufactured battery is conducted in the same manner as Embodiment Example 9.

Embodiment Example 18

In this example, an all-solid lithium secondary battery is manufactured in the same composition as that of Embodiment Example 9 except that heating and compression conditions applied to the battery element used are changed. While Embodiment Example 9 is treated at 310° C. for one hour, the battery in the present embodiment example is manufactured by heating/compression treatment at a heating temperature of 320° C., for a treatment time of about 6 hours. Charging and discharging of the manufactured battery is conducted in the same manner as Embodiment Example 9.

Embodiment Example 19

In this example, an all-solid lithium secondary battery is manufactured in the same composition as that of Embodiment Example 9 except that heating and compression conditions applied to the battery element used are changed. While Embodiment Example 9 is treated at 310° C. for one hour, the battery in the present embodiment example is manufactured by heating/compression treatment at a heating temperature of 300° C., for a treatment time of about 2 hours. A charge-discharge test on the manufactured battery is conducted in the same manner as Embodiment Example 9.

Embodiment Example 20

In this example, an all-solid lithium secondary battery is manufactured in the same composition as that of Embodiment Example 9 except that heating and compression conditions applied to the battery element used are changed. While Embodiment Example 9 is treated at 310° C. for one hour, the battery in the present embodiment example is manufactured by heating/compression treatment at a heating temperature of 300° C., for a treatment time of about 5 hours. A charge-discharge test on the manufactured battery is conducted in the same manner as Embodiment Example 9.

Embodiment Example 21

In this example, an all-solid lithium secondary battery is manufactured in the same composition as that of Embodiment Example 9 except that heating and compression conditions applied to the battery element used are changed. While Embodiment Example 9 is treated at 310° C. for one hour, the battery in the present embodiment example is manufactured by heating/compression treatment at a heating temperature of 300° C., for a treatment time of about 6 hours. A charge-discharge test on the manufactured battery is conducted in the same manner as Embodiment Example 9.

Embodiment Example 22

In this example, an all-solid lithium secondary battery is manufactured in the same composition as that of Embodiment Example 9 except that heating and compression conditions applied to the battery element used are changed. While Embodiment Example 9 is treated at 310° C. for one hour, the battery in the present embodiment example is manufactured by heating/compression treatment at a heating temperature of 250° C., for a treatment time of about 5 hours. A charge-discharge test on the manufactured battery is conducted in the same manner as Embodiment Example 9.

Embodiment Example 23

In this example, an all-solid lithium secondary battery is manufactured in the same composition as that of Embodiment Example 9 except that heating and compression conditions applied to the battery element used are changed. While Embodiment Example 9 is treated at 310° C. for one hour, the battery in the present embodiment example is manufactured by heating/compression treatment at a heating temperature of 220° C., for a treatment time of about 5 hours. A charge-discharge test on the manufactured battery is conducted in the same manner as Embodiment Example 9

Embodiment Example 24

In this example, an all-solid lithium secondary battery is manufactured in the same composition as that of Embodiment Example 9 except that heating and compression conditions applied to the battery element used are changed. While Embodiment Example 9 is treated at 310° C. for one hour, the battery in the present embodiment example is manufactured by heating/compression treatment at a heating temperature of 200° C., for a treatment time of about 4 hours. A charge-discharge test is conducted on the manufactured battery in the same manner as Embodiment Example 9

Embodiment Example 25

In this example, an all-solid lithium secondary battery is manufactured in the same composition as that of Embodiment Example 9 except that heating and compression conditions applied to the battery element used are changed. While Embodiment Example 9 is treated at 310° C. for one hour, the present embodiment example is treated at a heating temperature of 200° C. for a treatment time of about 6 hours. A charge-discharge test is conducted on the manufactured battery in the same manner as Embodiment Example 9

Embodiment Example 26

In this example, an all-solid lithium secondary battery is manufactured in the same composition as that of Embodiment Example 9, except that heating and compression conditions applied to the battery element used are changed. While Embodiment Example 9 is treated at 310° C. for one hour, the battery in the present embodiment example is manufactured by heating/compression treatment at a heating temperature of 180° C., for a treatment time of about 4 hours. A charge-discharge test is conducted on the manufactured battery in the same manner as Embodiment Example 9.

Embodiment Example 27

In manufacturing the batteries according to Embodiment Example 7 through Embodiment Example 26, low melting point glass frit (YEV8-4103 by Yamato Electronic Co., Ltd.) whose softening temperature is 320° C. or lower is filled around the battery element, thereby manufacturing the all-solid lithium secondary batteries having the structure shown in FIG. 2. However, in accordance with Embodiment Example 28, low melting point glass (YEV8-3111 by Yamato Electronic Co., Ltd., comprised of four constituents, $V_2O_5$—ZnO—BaO—$TeO_2$) is used, and all-solid lithium secondary batteries are manufactured in the same manner as in the case of Embodiment Example 7.

Embodiment Example 28

In manufacturing the batteries according to Embodiment Example 7 through Embodiment Example 26, low melting point glass frit (YEV8-4103 by Yamato Electronic Co., Ltd.) whose softening temperature is 320° C. or lower is filled around the battery element, thereby manufacturing the all-solid lithium secondary batteries having the structure shown in FIG. 2. However, in accordance with Embodiment Example 28, low melting point glass (YEV8-3102 by Yamato Electronic Co., Ltd., comprised of four constituents, $V_2O_5$—ZnO—BaO—$TeO_2$) is used, and all-solid lithium secondary batteries are manufactured in the same manner as in the case of Embodiment Example 7.

Embodiment Example 29

In manufacturing the batteries according to Embodiment Example 7 through Embodiment Example 26, low melting point glass frit (YEV8-4103 by Yamato Electronic Co., Ltd.) whose softening temperature is 320° C. or lower is filled around the battery element, thereby manufacturing the all-solid lithium secondary batteries having the structure shown in FIG. 2. However, in accordance with Embodiment Example 29, low melting point glass (YEV8-3302 by Yamato Electronic Co., Ltd., comprised of four constituents, $V_2O_5$—ZnO—BaO—$TeO_2$) is used, and all-solid lithium secondary batteries are manufactured in the same manner as in the case of Embodiment Example 7.

Embodiment Example 30

In manufacturing the batteries according to Embodiment Example 7 through Embodiment Example 26, low melting point glass frit (YEV8-4103 by Yamato Electronic Co., Ltd.) whose softening temperature is 320° C. or lower is filled around the battery element, thereby manufacturing the all-solid lithium secondary batteries having the structure shown in FIG. 2. However, in accordance with Embodiment Example 30, low melting point glass (YEV8-3118 by Yamato Electronic Co., Ltd., comprised of four constituents, $V_2O_5$—ZnO—BaO—$TeO_2$) is used, and all-solid lithium secondary batteries are manufactured in the same manner as in the case of Embodiment Example 7.

Embodiment Example 31

In manufacturing the batteries according to Embodiment Example 7 through Embodiment Example 26, low melting point glass frit whose softening temperature is 320° C. or lower is filled around the battery element, thereby manufacturing the all-solid lithium secondary batteries having the structure shown in FIG. 2. However, in accordance with Embodiment Example 31, as low melting point glass, PbO—$B_2O_3$—$SiO_2$—$Al_2O_3$ based sealing-bonding lead glass for IC packages (glass code No. LS-0803) is used, and all-solid lithium secondary batteries are manufactured generally in the same manner as in the case of Embodiment Example 7 except that the heating and compression treatment is conducted at 360° C. for 30 minutes.

Embodiment Example 32

In manufacturing the batteries according to Embodiment Example 7 through Embodiment Example 26, low melting point glass frit whose softening temperature is 320° C. or lower is filled around the battery element, thereby manufacturing the all-solid lithium secondary batteries having the structure shown in FIG. 2. However, in accordance with Embodiment Example 32, as low melting point glass, PbO—$B_2O_3$—$SiO_2$—$Al_2O_3$ based sealing-bonding lead glass for IC packages (glass code No. LS-1101) is used, and all-solid lithium secondary batteries are manufactured generally in the same manner as in the case of Embodiment Example 7 except that the heating and compression treatment is conducted at 360° C. for 30 minutes.

What is claimed is:

1. A solid electrolyte glass comprising:
    a sulfide-based lithium-ion-conducting solid electrolyte,
    wherein the sulfide-based lithium-ion-conducting solid electrolyte contains α-alumina, and a lithium containing compound selected from the group consisting of $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$, $Li_2S$—$P_2S_5$—LiI, $Li_2S$—$P_2S_5$-ZmSn, and $Li_2S$—$GeS_2$ wherein,
    Z=Ge, Zn, Ga,
    m is integer except 0, and
    n is integer except 0,
    α-alumina is mixed in the sulfide-based lithium-ion-conducting solid electrolyte in a range of from 5 to 7 wt % based on the weight of the sulfide-based lithium-ion-conducting solid electrolyte, and
    the chemical constituents in the lithium containing compound are chemically bonded together.

2. A method for manufacturing an all-solid lithium secondary battery comprising the sulfide-based lithium-ion-conducting solid electrolyte glass of claim 1, the method comprising steps of:
    heating and melting a mixture containing the α-alumina and the lithium containing compound selected from the group consisting of selected from the group consisting of $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$, $Li_2S$—$P_2S_5$—LiI, $Li_2S$—$P_2S_5$-ZmSn, and $Li_2S$—$GeS_2$ wherein,
    Z=Ge, Zn, Ga,
    m is integer except 0, and
    n is integer except 0, and
    rapidly cooling the mixture that is heated and melted.

3. The method for manufacturing an all-solid lithium secondary battery according to claim 2, further comprising steps of:
    preparing at least one electrode layer that is one of a positive electrode layer and a negative electrode layer; and
    heating and compressing electrolyte powder formed from the sulfide-based lithium-ion-conducting solid electrolyte glass with the electrode layer, thereby forming an all-solid lithium secondary battery element having the electrode layer and the electrolyte layer integrated in one piece.

4. The method for manufacturing an all-solid lithium secondary battery according to claim 3, wherein the heating is conduced under a temperature condition in the range of a glass softening temperature of the sulfide-based lithium-ion-conducting solid electrolyte glass, and the heating is conducted in a time range in which crystallization of the sulfide-based lithium-ion-conducting solid electrolyte glass does not progress.

5. The method for manufacturing an all-solid lithium secondary battery according to claim 4, wherein the range of the glass softening temperature is between 200° C. and 300° C., and the time range in which the crystallization does not progress is within five hours.

6. The method for manufacturing an all-solid lithium secondary battery according to claim 3, further comprising a step of sealing at least a portion of the all-solid lithium secondary battery element with a low melting point glass whose softening temperature is 350° C. or below.

7. The method for manufacturing an all-solid lithium secondary battery according to claim 6, wherein the low melting point glass is glass made of four compositions, the four compositions being $V_2O_5$, ZnO, BaO and $TeO_2$.

8. The method for manufacturing an all-solid lithium secondary battery according to claim 6, wherein all of the steps are continuously processed in a dry inert gas atmosphere.

9. The solid electrolyte glass according to claim 1, wherein the lithium containing compound is $Li_2S$—$SiS_2$—LiBr or $Li_2S$—$SiS_2$—LiCl.

10. The solid electrolyte glass according to claim 1, wherein the lithium containing compound is $Li_2S$—$SiS_2$, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$, $Li_2S$—$P_2S_5$—LiI, $Li_2S$—$P_2S_5$-ZmSn, or $Li_2S$—$GeS_2$ wherein, Z=Ge, Zn, Ga, m is integer except 0, and n is integer except 0.

11. The solid electrolyte glass according to claim 1, wherein the lithium containing compound is $Li_2S$—$B_2S_3$.

12. An all-solid lithium secondary battery comprising:

a sulfide-based lithium-ion-conducting solid electrolyte as a solid electrolyte glass, the sulfide-based lithium-ion-conducting solid electrolyte containing α-alumina and a lithium containing compound selected from the group consisting of $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$, $Li_2S$—$P_2S_5$—LiI, $Li_2S$—$P_2S_5$-ZmSn, and $Li_2S$—$GeS_2$ wherein, Z=Ge, Zn, Ga, m is integer except 0, and n is integer except 0, α-alumina is mixed in the sulfide-based lithium-ion-conducting solid electrolyte in a range of from 5 to 7 wt % based on the weight of the sulfide-based lithium-ion-conducting solid electrolyte, and the chemical constituents in the lithium containing compound are chemically bonded together.

13. The all-solid lithium secondary battery according to claim 12, further comprising an all-solid lithium secondary battery element having the solid electrolyte glass in a layer interposed between a pair of electrodes formed from a positive electrode layer and a negative electrode layer.

14. The all-solid lithium secondary battery according to claim 13, wherein the all-solid lithium secondary battery element is formed by molding one of the positive electrode layer and the negative electrode layer in one piece with the solid electrolyte glass in a layer.

15. The all-solid lithium secondary battery according to claim 12, wherein the lithium containing compound is $Li_2S$—$SiS_2$—LiBr or $Li_2S$—$SiS_2$—LiCl.

16. The all-solid lithium secondary battery according to claim 12, wherein the lithium containing compound is $Li_2S$—$SiS_2$, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$, $Li_2S$—$P_2S_5$—LiI, $Li_2S$—$P_2S_5$-ZmSn, or $Li_2S$—$GeS_2$ wherein, Z=Ge, Zn, Ga, m is integer except 0, and n is integer except 0.

17. The all-solid lithium secondary battery according to claim 12, wherein the lithium containing compound is $Li_2S$—$B_2S_3$.

18. A solid electrolyte glass comprising:

a sulfide-based lithium-ion-conducting solid electrolyte, wherein the sulfide-based lithium-ion-conducting solid electrolyte consists essentially of α-alumina and a lithium containing compound selected from the group consisting of $Li_2S$—$SiS_2$, $Li_2S$—$SiS_2$—LiI, $Li_2S$—$SiS_2$—LiBr, $Li_2S$—$Sis_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—LiI, $Li_2S$—$P_2S_5$-ZmSn, and $Li_2S$—$GeS_2$ wherein, Z=Ge, Zn, Ga, m is integer except 0, and n is integer except 0, and the solid electrolyte glass is formed by heating and melting a mixture that consists essentially of the α-alumina and the lithium containing compound, and cooling the mixture that is heated and melted.

* * * * *